US012315985B2

(12) United States Patent
Montoya et al.

(10) Patent No.: US 12,315,985 B2
(45) Date of Patent: May 27, 2025

(54) ANTENNAS FOR RADIO-FREQUENCY LOCALIZATION

(71) Applicant: Humatics Corporation, Waltham, MA (US)

(72) Inventors: Christopher Ryan Montoya, Waltham, MA (US); Gregory L. Charvat, Guilford, CT (US); Andrew Habib Zai, Sudbury, MA (US)

(73) Assignee: Humatics Corporation, Waltham, MA (US)

( * ) Notice: Subject to any disclaimer, the term of this patent is extended or adjusted under 35 U.S.C. 154(b) by 494 days.

(21) Appl. No.: 17/380,743

(22) Filed: Jul. 20, 2021

(65) Prior Publication Data

US 2022/0021120 A1 Jan. 20, 2022

Related U.S. Application Data

(60) Provisional application No. 63/092,776, filed on Oct. 16, 2020, provisional application No. 63/054,154, filed on Jul. 20, 2020.

(51) Int. Cl.
*H01Q 9/04* (2006.01)
*H01Q 1/22* (2006.01)
(Continued)

(52) U.S. Cl.
CPC ......... *H01Q 1/2283* (2013.01); *H01Q 1/2216* (2013.01); *H01Q 1/525* (2013.01); *H01Q 9/0457* (2013.01); *H01Q 23/00* (2013.01)

(58) Field of Classification Search
CPC .. H01Q 1/2208; H01Q 1/2216; H01Q 1/2225; H01Q 1/525; H01Q 1/2283;
(Continued)

(56) References Cited

U.S. PATENT DOCUMENTS

2008/0079644 A1* 4/2008 Cheng .................... H01Q 13/10 343/769
2016/0204514 A1 7/2016 Miraftab et al.
(Continued)

FOREIGN PATENT DOCUMENTS

JP 2019009544 A * 1/2019

OTHER PUBLICATIONS

International Search Report and Written Opinion for International Application No. PCT/US2021/042312 mailed Oct. 21, 2021.

*Primary Examiner* — Robert Karacsony
(74) *Attorney, Agent, or Firm* — Wolf, Greenfield & Sacks, P.C.

(57) ABSTRACT

Described herein are systems for radio-frequency (RF) localization. The systems developed by the inventors are designed to improve the accuracy of RF localization to millimeter and sub-millimeter ranges, and additionally, are designed to do so while also limiting manufacturing costs. The RF localization systems developed by the inventors leverage the relatively low costs associated with the manufacturing of printed circuit board assemblies (PCBAs). Manufacturing RF localization devices using PCBAs poses a number of challenges, including large minimum feature size and the presence of surface waves. Described herein are techniques for addressing challenges arising in connection with RF localization devices fabricated using PCBAs. One technique involves the use of slot-fed antennas, which makes the device efficient notwithstanding the large minimum feature size. Another technique involves the use of frequency selective surfaces for suppressing surface waves.

14 Claims, 18 Drawing Sheets

(51) Int. Cl.
*H01Q 1/52* (2006.01)
*H01Q 23/00* (2006.01)

(58) Field of Classification Search
CPC ...... H01Q 5/307; H01Q 9/0457; H01Q 23/00; H01Q 21/28; G01S 13/74
See application file for complete search history.

(56) References Cited

U.S. PATENT DOCUMENTS

| | | | |
|---|---|---|---|
| 2019/0036206 | A1 | 1/2019 | De Rochemont |
| 2020/0103492 | A1 | 4/2020 | Zai et al. |

* cited by examiner

ANTENNAS FOR RADIO-FREQUENCY LOCALIZATION

CROSS-REFERENCE TO RELATED APPLICATIONS

This application claims priority under 35 U.S.C. § 119(e) to U.S. Provisional Application Ser. No. 63/092,776, titled "ANTENNAS FOR RADIO-FREQUENCY LOCALIZATION", filed on Oct. 16, 2020, and claims priority under 35 U.S.C. § 119(e) to U.S. Provisional Application Ser. No. 63/054,154, titled "ANTENNAS FOR RADIO-FREQUENCY LOCALIZATION", filed on Jul. 20, 2020, each application of which is incorporated by reference herein in its entirety.

BACKGROUND

The ability to accurately determine the location of an object or target has potential benefits for numerous applications. Some exemplary applications benefitting from object localization include motion tracking, virtual reality, gaming, autonomous systems, robotics, etc. A number of technologies have been pursued that seek to provide localization, including global positioning system (GPS) technology, received signal strength indicator (RSSI) measurements, optical image data processing techniques, infrared ranging, etc. Generally, these conventional approaches are limited in application due to one or more deficiencies, including relatively poor or insufficient accuracy and/or precision, computational complexity resulting in relatively long refresh rates, environmental limitations (e.g., operation limited to outdoors, cellular or network access requirements and/or vulnerability to background clutter or noise), cost, size, etc.

SUMMARY

Some embodiments relate to a radio-frequency (RF) device comprising a substrate comprising: a first RF antenna configured for wireless communication in a first RF band; a second RF antenna configured for wireless communication in a second RF band different from the first RF band; and a frequency selective surface (FSS) device surrounding the second RF antenna.

In some embodiments, the FSS device is arranged to suppress electromagnetic energy present in the second RF band. In some embodiments, the FSS device comprises a plurality of structures arranged in a two-dimensional periodic configuration. In some embodiments, at least some of the plurality of structures comprise buried vias. In some embodiments, the substrate comprises a first dielectric layer and a second dielectric layer, and at least some of the buried vias are positioned between the first dielectric layer and the second dielectric layer. In some embodiments, the first RF antenna comprises a thru-substrate via that passes through at least one of the first and second dielectric layers. In some embodiments, the first RF antenna comprises a disc-shaped patch RF antenna. In some embodiments, the first antenna is partially suspended above a top surface of the substrate.

In some embodiments, the first RF antenna and the second RF antenna are millimeter-wave antennas. In some embodiments, the first RF band does not overlap with the second RF band. In some embodiments, the first RF antenna has a resonant frequency between 55 GHz and 65 GHz, and the second RF antenna has a resonant frequency between 110 GHz and 130 GHz. In some embodiments, the RF device further comprises an integrated circuit (IC) mounted on the substrate and coupled to both the first RF antenna and the second RF antenna. In some embodiments, the IC comprises a frequency converter configured to, in response to receiving a first RF signal oscillating at a first center frequency from the first RF antenna, feed the second RF antenna with a second RF signal oscillating at a second center frequency different from the first center frequency. In some embodiments, the frequency converter comprises a frequency doubler, and the second center frequency is approximately twice the first center frequency.

In some embodiments, the RF device further comprises an absorber positioned to absorb at least some electromagnetic energy emitted by the second RF antenna. In some embodiments, the substrate further comprises a pair of antenna feeds electrically coupled with the first RF antenna.

In some embodiments, the first RF antenna is configured to transmit a first RF signal having a first center frequency to a target device different from the RF device and the second RF antenna is configured to receive, from the target device, a second RF signal having a second center frequency different from the first center frequency. In some embodiments, the RF device further comprises circuitry configured to provide to the first RF antenna the first RF signal having the first center frequency to be transmitted by the first RF antenna and process the second RF signal having the second center frequency received by the second RF antenna together with a reference version of the first RF signal having the first center frequency to obtain an RF signal indicative of a distance between the RF device and the target device.

In some embodiments, the first RF antenna is configured to receive a first RF signal having a first center frequency from an interrogator device different from the RF device and the second RF antenna is configured to transmit, to the interrogator device, a second RF signal having a second center frequency different from the first center frequency. In some embodiments, the RF device further comprises circuitry configured to receive the first RF signal from the first RF antenna, generate the second RF signal in response to receiving the first RF signal, and provide to the second RF antenna the second RF signal to be transmitted by the second RF antenna.

In some embodiments, the substrate has at least one serrated edge. In some embodiments, the RF device further comprises a via fence disposed adjacent to the second RF antenna.

Some embodiments relate to a radio-frequency (RF) device comprising one or more substrates collectively comprising: a first RF antenna configured for wireless communication in a first RF band; a second RF antenna configured for wireless communication in a second RF band different from the first RF band; a first slot and a second slot; a first antenna feed coupled to the first slot, wherein the first antenna feed is configured to communicate with the first RF antenna through the first slot; and a second antenna feed coupled to the second slot, wherein the second antenna feed is configured to communicate with the second RF antenna through the second slot.

In some embodiments, the one or more substrates comprises a first substrate and a second substrate, the first substrate comprises the first RF antenna, the first slot and the first antenna feed, and the second substrate comprises the second RF antenna, the second slot and the second antenna feed. In some embodiments, the one or more substrates comprises a single substrate comprising the first and second RF antennas, the first and second slots and the first and second antenna feeds.

In some embodiments, the first and second slots have substantially different shapes relative to each other. In some embodiments, the first slot is L-shaped. In some embodiments, the second slot is not L-shaped. In some embodiments, the second slot is ring-shaped. In some embodiments, the first slot is not ring-shaped. In some embodiments, the first slot has a segmented contour and the second slot has a continuous contour. In some embodiments, the first slot is L-shaped and the second slot is ring-shaped.

In some embodiments, the one or more substrates further comprises a third antenna feed configured to communicate with the second RF antenna, and the second and third antenna feeds are configured to drive the second RF antenna differentially. In some embodiments, the one more substrates further comprises a phase shifter coupled with the third antenna feed. In some embodiments, the phase shifter is arranged to produce a $\pm\pi/2$ phase shift between the second and third antenna feeds.

In some embodiments, the first RF antenna is patterned on a first conductive layer of the one or more substrates, and the first RF antenna feed is patterned on a second conductive layer of the one or more substrates. In some embodiments, the first slot is formed through a third conductive layer of the one or more substrates, the third conductive layer being positioned between the first and second conductive layers. In some embodiments, the second RF antenna is patterned on a fourth conductive layer of the one or more substrates, and the second RF antenna feed is patterned on the second conductive layer of the one or more substrates. In some embodiments, the RF device further comprises an absorber positioned to absorb at least some electromagnetic energy emitted by the second RF antenna.

In some embodiments, the first RF antenna is configured to transmit a first RF signal having a first center frequency to a target device different from the RF device and the second RF antenna is configured to receive, from the target device, a second RF signal having a second center frequency different from the first center frequency. In some embodiments, the RF device further comprises circuitry configured to provide to the first RF antenna the first RF signal having the first center frequency to be transmitted by the first RF antenna and process the second RF signal having the second center frequency received by the second RF antenna together with a reference version of the first RF signal having the first center frequency to obtain an RF signal indicative of a distance between the RF device and the target device.

In some embodiments, the first RF antenna is configured to receive a first RF signal having a first center frequency from an interrogator device different from the RF device and the second RF antenna is configured to transmit, to the interrogator device, a second RF signal having a second center frequency different from the first center frequency. In some embodiments, the RF device further comprises circuitry configured to receive the first RF signal from the first RF antenna, generate the second RF signal in response to receiving the first RF signal, and provide to the second RF antenna the second RF signal to be transmitted by the second RF antenna.

Some embodiments relate to a radio-frequency (RF) device comprising a substrate comprising a first conductive layer patterned with a first patch antenna; a second conductive layer patterned with a second patch antenna; a third conductive layer having a first slot overlapping, at least partially, with the first patch antenna and a second slot overlapping, at least partially, with the second patch antenna; and a fourth conductive layer patterned with a first antenna feed overlapping, at least partially, with the first slot and a second antenna feed overlapping, at least partially, with the second slot.

In some embodiments, the substrate further comprises a frequency selective surface device formed on the second conductive layer. In some embodiments, the second conductive layer is between the first conductive layer and the third conductive layer. In some embodiments, the third conductive layer is between the second conductive layer and the fourth conductive layer. In some embodiments, the substrate further comprises a core dielectric layer disposed between the first conductive layer and the fourth conductive layer.

In some embodiments, the substrate further comprises an antenna via electrically coupled to the first patch antenna and passing through at least the second and third conductive layers. In some embodiments, the RF device further comprises a printed circuit board on which the substrate is mounted, and the substrate further comprises a bottom via electrically coupling the printed circuit board to the fourth conductive layer. In some embodiments, the substrate further comprises a buried via electrically coupling the second patch antenna to the third conductive layer.

In some embodiments, the first patch antenna is configured to transmit a first RF signal having a first center frequency to a target device different from the RF device and the second patch antenna is configured to receive, from the target device, a second RF signal having a second center frequency different from the first center frequency. In some embodiments, the RF device further comprises circuitry configured to provide to the first patch antenna the first RF signal having the first center frequency to be transmitted by the first RF antenna and process the second RF signal having the second center frequency received by the second patch antenna together with a reference version of the first RF signal having the first center frequency to obtain an RF signal indicative of a distance between the RF device and the target device.

In some embodiments, the first patch antenna is configured to receive a first RF signal having a first center frequency from an interrogator device different from the RF device and the second patch antenna is configured to transmit, to the interrogator device, a second RF signal having a second center frequency different from the first center frequency. In some embodiments, the RF device further comprises circuitry configured to receive the first RF signal from the first patch antenna, generate the second RF signal in response to receiving the first RF signal, and provide to the second patch antenna the second RF signal to be transmitted by the second patch antenna.

In some embodiments, the substrate has at least one serrated edge. In some embodiments, the substrate further comprises a via fence.

Some embodiments relate a system comprising an interrogator device, the interrogator device comprising a substrate comprising: a transmit RF antenna configured to transmit a first radio-frequency (RF) signal having a first center frequency to a target device different from the interrogator device; a receive RF antenna configured to receive, from the target device, a second RF signal having a second center frequency different from the first center frequency; and a frequency selective surface (FSS) device surrounding the receive RF antenna; and circuitry configured to: provide to the transmit RF antenna the first RF signal having the first center frequency to be transmitted by the transmit RF antenna; and process the second RF signal having the second center frequency received by the receive RF antenna together with a reference version of the first RF signal having the first center frequency to obtain an RF signal indicative of a distance between the interrogator device and the target device.

In some embodiments, the FSS device is arranged to suppress electromagnetic energy oscillating at the second center frequency. In some embodiments, the FSS device comprises a plurality of structures arranged in a two-dimensional periodic configuration. In some embodiments, at least some of the plurality of structures comprise buried vias. In some embodiments, the substrate comprises a first dielectric layer and a second dielectric layer, and the buried vias are positioned between the first dielectric layer and the second dielectric layer. In some embodiments, the transmit RF antenna comprises a thru-substrate via that passes through at least one of the first and second dielectric layers. In some embodiments, the transmit RF antenna comprises a disc-shaped patch antenna. In some embodiments, the transmit RF antenna is partially suspended.

In some embodiments, the transmit RF antenna and the receive RF antenna are millimeter-wave antennas. In some embodiments, the first center frequency is less than the second center frequency. In some embodiments, the transmit RF antenna has a resonant frequency between 55 GHz and 65 GHz, and the receive RF antenna has a resonant frequency between 110 GHz and 130 GHz.

Some embodiments relate to a system comprising an interrogator device, the interrogator device comprising: one or more substrates collectively comprising: a transmit RF antenna configured to transmit a first radio-frequency (RF) signal having a first center frequency to a target device different from the interrogator device; a receive RF antenna configured to receive, from the target device, a second RF signal having a second center frequency different from the first center frequency; a first slot and a second slot; a first antenna feed coupled to the first slot, wherein the first antenna feed is configured to communicate with the transmit antenna through the first slot; and a second antenna feed coupled to the second slot, wherein the second antenna feed is configured to communicate with the receive RF antenna through the second slot; and circuitry configured to: provide to the transmit RF antenna the transmit RF signal having the first center frequency to be transmitted by the transmit RF antenna; and process the receive RF signal having the second center frequency received by the receive RF antenna together with a reference version of the transmit RF signal having the first center frequency to obtain an RF signal indicative of a distance between the interrogator device and the target device.

In some embodiments, the one or more substrates comprises a first substrate and a second substrate, the first substrate comprises the transmit RF antenna, the first slot and the first antenna feed, and the second substrate comprises the receive RF antenna, the second slot and the second antenna feed. In some embodiments, the one or more substrates comprises a single substrate comprising the transmit and receive RF antennas, the first and second slots and the first and second antenna feeds.

In some embodiments, the first and second slots have substantially different shapes relative to each other. In some embodiments, the first slot is L-shaped. In some embodiments, the second slot is not L-shaped. In some embodiments, the second slot is ring-shaped. In some embodiments, the first slot is not ring-shaped. In some embodiments, the first slot has a segmented contour and the second slot has a continuous contour. In some embodiments, the first slot is L-shaped and the second slot is ring-shaped.

In some embodiments, the one or more substrates further comprises a third antenna feed configured to communicate with the receive RF antenna, and the second and third antenna feeds are configured to drive the receive RF antenna differentially. In some embodiments, the one or more substrates further comprises a phase shifter coupled with the third antenna feed. In some embodiments, the phase shifter is arranged to produce a $\pm\pi/2$ phase shift between the second and third antenna feeds.

In some embodiments, the transmit RF antenna is patterned on a first conductive layer of the one or more substrates, and the transmit RF antenna feed is patterned on a second conductive layer of the one or more substrates. In some embodiments, the first slot is formed through a third conductive layer of the substrate, the third conductive layer being positioned between the first and second conductive layers. In some embodiments, the receive RF antenna is patterned on a fourth conductive layer of the one or more substrates, and the second antenna feed is patterned on the second conductive layer of the one or more substrates. In some embodiments, the system further comprises an absorber positioned to absorb at least some electromagnetic energy emitted by the second RF antenna.

Some embodiments relate to a system comprising an interrogator device, the interrogator device comprising: a substrate comprising: a first conductive layer patterned with a first patch antenna, the first patch antenna being configured to transmit a first radio-frequency (RF) signal having a first center frequency to a target device different from the interrogator device; a second conductive layer patterned with a second patch antenna, the second patch antenna being configured to receive, from the target device, a second RF signal having a second center frequency different from the first center frequency; a third conductive layer having a first slot overlapping, at least partially, with the first patch antenna and a second slot overlapping, at least partially, with the second patch antenna; and a fourth conductive layer having a first antenna feed overlapping, at least partially, with the first slot and a second antenna feed overlapping, at least partially, with the second slot; and circuitry configured to: provide to the first patch antenna the first RF signal having the first center frequency to be transmitted by the transmit antenna; and process the second RF signal having the second center frequency received by the second patch antenna together with a reference version of the first RF signal having the first center frequency to obtain an RF signal indicative of a distance between the interrogator device and the target device.

In some embodiments, the substrate further comprises a plurality of frequency selective structures formed on the second conductive layer. In some embodiments, the second conductive layer is between the first conductive layer and the third conductive layer. In some embodiments, the third conductive layer is between the second conductive layer and the fourth conductive layer. In some embodiments, the substrate further comprises a core dielectric layer disposed between the first conductive layer and the fourth conductive layer.

In some embodiments, the substrate further comprises an antenna via electrically coupled to the first patch antenna and passing through at least the second and third conductive layers. In some embodiments, the interrogator devices further comprises a printed circuit board on which the substrate is mounted, wherein the substrate further comprises a bottom via electrically coupling the printed circuit board to the fourth conductive layer. In some embodiments, the substrate further comprises a buried via electrically coupling the second patch antenna to the third conductive layer.

Some embodiments relate to a radio-frequency (RF) device comprising a substrate comprising a first RF antenna configured for wireless communication in a first RF band; a second RF antenna configured for wireless communication in a second RF band different from the first RF band; and means for suppressing surface waves generated by the second RF antenna, wherein the means surrounds the second RF antenna.

Some embodiments relate to a radio-frequency (RF) device comprising a substrate comprising a first RF antenna configured for wireless communication in a first RF band; a second RF antenna configured for wireless communication in a second RF band different from the first RF band; and a structure configured to suppress surface waves generated by the second RF antenna, wherein the structure surrounds the second RF antenna.

In some embodiments, the structure comprises a frequency selective surface (FSS) device. In some embodiments, the structure comprises a via fence comprising a plurality of vias. In some embodiments, the plurality of vias are disposed around a perimeter of the second RF antenna. In some embodiments, the plurality of vias pass through at least one conductive layer of the substrate. In some embodiments, the plurality of vias pass through a plurality of conductive layers of the substrate.

In some embodiments, the first RF antenna comprises a disc-shaped patch RF antenna. In some embodiments, the first antenna is partially suspended above a top surface of the substrate. In some embodiments, the first RF antenna and the second RF antenna are millimeter-wave antennas. In some embodiments, the first RF band does not overlap with the second RF band. In some embodiments, the first RF antenna has a resonant frequency between 55 GHz and 65 GHz, and wherein the second RF antenna has a resonant frequency between 110 GHz and 130 GHz.

In some embodiments, the RF device further comprises an integrated circuit (IC) mounted on the substrate and coupled to both the first RF antenna and the second RF antenna. In some embodiments, the IC comprises a frequency converter configured to, in response to receiving a first RF signal oscillating at a first center frequency from the first RF antenna, feed the second RF antenna with a second RF signal oscillating at a second center frequency different from the first center frequency. In some embodiments, the frequency converter comprises a frequency doubler, and wherein the second center frequency is approximately twice the first center frequency.

In some embodiments, the RF device further comprises an absorber positioned to absorb at least some electromagnetic energy emitted by the second RF antenna. In some embodiments, the substrate further comprises a pair of antenna feeds electrically coupled with the first RF antenna.

In some embodiments, the first RF antenna is configured to transmit a first RF signal having a first center frequency to a target device different from the RF device and the second RF antenna is configured to receive, from the target device, a second RF signal having a second center frequency different from the first center frequency. In some embodiments, the RF device further comprises circuitry configured to provide to the first RF antenna the first RF signal having the first center frequency to be transmitted by the first RF antenna and process the second RF signal having the second center frequency received by the second RF antenna together with a reference version of the first RF signal having the first center frequency to obtain an RF signal indicative of a distance between the RF device and the target device.

In some embodiments, the first RF antenna is configured to receive a first RF signal having a first center frequency from an interrogator device different from the RF device and the second RF antenna is configured to transmit, to the interrogator device, a second RF signal having a second center frequency different from the first center frequency. In some embodiments, the RF device further comprises circuitry configured to receive the first RF signal from the first RF antenna, generate the second RF signal in response to receiving the first RF signal, and provide to the second RF antenna the second RF signal to be transmitted by the second RF antenna.

In some embodiments, the substrate has at least one serrated edge.

Some embodiments relate to a radio-frequency (RF) device comprising a substrate comprising: a first RF antenna configured for wireless communication in a first RF band; a second RF antenna configured for wireless communication in a second RF band different from the first RF band; and a structure surrounding the second RF antenna, wherein the structure comprises a frequency selective surface (FSS) device and/or a via fence.

BRIEF DESCRIPTION OF DRAWINGS

Various aspects and embodiments will be described with reference to the following figures. It should be appreciated that the figures are not necessarily drawn to scale.

DETAILED DESCRIPTION

I. Overview

Figure 1A:
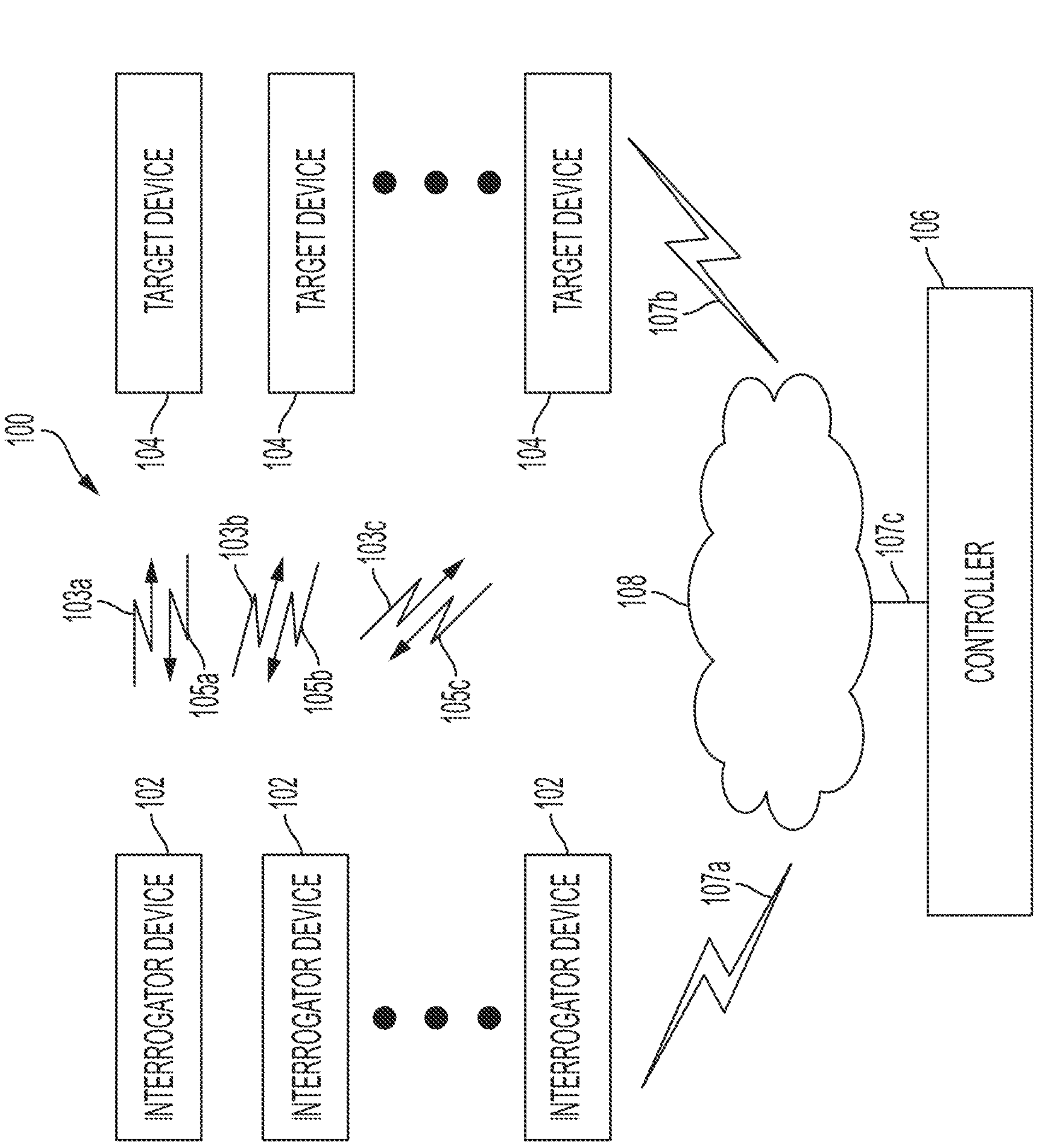
FIG. 1A is a block diagram of an illustrative system that may be used to implement radio frequency (RF) localization techniques, in accordance with some embodiments of the technology described herein.

Described herein are systems for radio-frequency (RF) localization. The systems developed by the inventors are designed to improve the accuracy of RF localization to millimeter and sub-millimeter ranges, and additionally, are designed to do so while also limiting manufacturing costs.

Several techniques are described herein for improving the accuracy of RF localization, according to some embodiments of the present technology. First, the inventors have appreciated that operating RF localization systems at relatively high frequencies increases localization accuracy. The spatial resolution of an RF localization system depends, among other parameters, on the wavelengths of the electromagnetic signals. The larger the frequency, the smaller the wavelength and, therefore, the larger the spatial resolution. Accordingly, in some embodiments, the systems described herein are configured to operate in the microwave range or in the millimeter wave range.

Second, the inventors have appreciated that resolving the location of a target device with a high degree of accuracy further depends on the ability of an interrogator to receive RF signals transmitted by a target device with relatively high signal-to-noise ratio (SNR). In some embodiments, the SNR can be increased by reducing the degree to which an interrogation RF signal (a signal transmitted by an interrogator device to a target device) interferes with a response RF signal (a signal transmitted by the target device to the interrogator device in response to receiving the interrogation RF signal). To reduce interference between interrogator and response signals, the system may be configuring so that the interrogator and target devices transmit at different frequencies. Accordingly, in some embodiments, an interrogator device transmits an interrogation RF signal having a first center frequency and, in response to receiving the interrogation RF signal, a target device transmits a response RF signal having a second center frequency different from the first center frequency.

Third, the inventors have appreciated that the limited power budget available on an RF localization system link further limits its ability to accurately localize objects. Government agencies that regulate RF communications around the world (e.g., the Federal Communications Commission in the United States) restrict the amount of power that can be transmitted in free space. Therefore, the power that an interrogator device can transmit at a particular frequency may not exceed the maximum power that the regulatory agency allows at that frequency. In order to meet the power budget of an RF localization system link notwithstanding the limited interrogation RF power, in some embodiments, high-gain amplifiers are utilized on the receiver side of the link. Unfortunately, high-gain amplifiers produce substantial noise, which negatively effects the system's ability to perform accurate localization. The inventors have appreciated that the system's susceptibility to noise may be reduced by controlling the antennas (the receive and/or the transmit antennas) in a differential fashion. A differential configuration may be obtained in some embodiments by using, for each antenna, a pair of antenna feeds. Statistically, each feed of the pair receives the same (or substantially the same) amount of noise. As such, the noise can be eliminated (or at least reduced) by using appropriate circuitry designed to subtract the power present on one feed from the power present on the other feed.

Fourth, the inventors have appreciated that unintended radiation, whether in the form of currents on the surface, the side, or bottom of a device substrate, can cause errors in location accuracy. This occurs because the superposition of waves generated by unintended radiation sources interferes with interrogation and response RF signals, thereby causing inaccuracies in the system's ability to determine the position of an antenna. These sources include, but are not limited to, surface wave modes, impedance mismatches between chip, phase shifters, antenna, and/or any on-chip components, and back-lobe radiation out of the back of the substrate reflecting off of other parts of the system.

Fifth, the inventors have appreciated that multipath propagation further limits the ability of a system to provide accurate localization. Multipath propagation occurs when multiple copies of an RF signal are produced as a result of the primary RF signal reflecting against walls or other obstacles positioned between the interrogator and the target device. At each reflection, the primary RF loses a fraction of its power. In some instances, the primary RF signal may undergo so many reflections that the power with which it reaches the other side of the link is insufficient to allow for an accurate reading. In some embodiments, the system's susceptibility to multipath propagation can be reduced by appropriately engineering the polarization of the RF signals transmitted by interrogator and target devices. In some embodiments, a receive antenna may be configured to receive RF signals having one type of polarization and a transmit antenna may be configured to transmit RF signals having a different type of polarization. Such a configuration may be advantageous in that it reduces the effects of multipath on the signals received by an interrogator device in communication with a target device. For example, the receive antenna of a target device may be configured to receive RF signals circularly polarized in a first rotational direction and the transmit antenna of the target device may be configured to transmit RF signals circularly polarized in a second rotational direction different (e.g., opposite) from the first rotational direction. As a specific example, a receive antenna may be configured to receive RF signals circularly polarized in a clockwise (or counter-clockwise) direction and a transmit antenna may be configured to receive RF signals circularly polarized in the counter-clockwise (or clockwise) direction.

Sixth, the inventors have appreciated that, in certain applications, target devices move across large areas, often in an unpredictable fashion. This behavior makes it difficult to track the location of a target device in real-time and at all times. Consider for example RF localization in the context of robotic systems, in which a target device is mounted on a robot and monitors the location of the robot in real-time. Over time, the location of the robot may vary substantially, depending on the needs of the application. From the standpoint of RF localization, this poses a challenge—the target device may exit the field of view of the interrogator's antenna, thus affecting the interrogator's ability to monitor the location of the robot. One way to address this problem is to deploy several interrogating antennas, where each antenna emits in a different direction. The interrogating antennas may be positioned in relation to one another so that, collectively, they cover the entire field of motion of the robot, thereby enabling monitoring of the robot's location at all times. The inventors have appreciated, however, that this approach can be costly, as it calls for the deployment of several antennas. RF localization systems according to some embodiments address this problem by designing antennas with large fields of view. In some embodiments, for example, antennas with fields of view as high as 80 or 90 degrees (or more) may be used to ensure that a target device be monitored continuously and uninterruptedly. As a result, fewer antennas may be deployed, thus reducing costs.

The inventors have appreciated that designing RF localization systems in accordance with one or more of the techniques described above can improve the accuracy with which objects are localized, and as a result, can accelerate the spread of this technology to new applications. The inventors have further appreciated, however, that designing RF localization systems in accordance with one or more of the techniques described above can be overly costly in some circumstances. In some high-performance applications, such as in advanced scientific research, high costs may be justified. However, in large-volume applications, such as in manufacturing and transportation, high costs may be unacceptable.

Accordingly, the inventors have developed RF localization systems that not only implement one or more of the techniques described above, but are also relatively inexpensive. The RF localization systems developed by the inventors leverage the relatively low costs associated with the manufacturing of printed circuit board assemblies (PCBAs). A printed circuit board (PCB) is a board that electrically connects electronic components using conductive traces, pads, and other features etched from foils (e.g., made of copper) laminated onto a non-conductive substrate. FR-4 glass epoxy is one of the most commonly used insulating materials for non-conductive substrates, though other materials are also possible. Components are generally soldered onto a PCB to both electrically connect and mechanically fasten them to it. A PCBA is the board after all the components and parts have been soldered and installed on the PCB to accomplish the electronic function that the system was designed for. PCBAs leverage surface-mount technology (SMT), a technique particularly suitable for manufacturing involving high degrees of automation. Compared with other technologies such as through-hole circuit boards, use of SMT leads to reduced labor costs and increased production rates. Further, manufacturing PCBAs is generally less costly than manufacturing circuits that are fully integrated on silicon, such as integrated circuits (ICs). Manufacturing ICs involves sophisticated, state-of-the-art fabrication processes with spatial resolutions in the order of a few nanometers, which enables integration of millions (if not billions) of electronic components on a single die. While the costs associated with IC manufacturing is justified for use in markets characterized by massive volumes such as solid state memories, graphic processing units (GPUs) and smartphone chipsets, PCBA-based systems are more suitable for the economics of RF localization.

Thus, some embodiments relate to RF localization systems manufactured using PCBA-compatible techniques. The inventors have appreciated, however, that manufacturing RF localization devices using PCBAs poses a new set of challenges. First, the electrical properties of PCBAs are less-than-ideal because PCBAs are implemented on dielectric materials having relatively low dielectric constants (e.g., with relative dielectric constant less than 3). This is because low-dielectric constant materials are generally less costly than high-dielectric constant materials. As described in detail further below, use of low-dielectric constant materials leads to the generation of transverse surface waves, which can negatively impact the accuracy of an RF localization system because it leads to cross-coupling between the transmit antenna and the receive antenna. Second, the electrical properties of PCBAs are further affected by the fact that the dielectric materials commonly used in PCBAs are very thin. Again, this is because thin dielectric materials are generally less costly than thick dielectric materials. The small thicknesses of these dielectric materials further contributes to the generation of transverse surface waves. Third, the ability to pattern electric structures on a PCBA is affected by the relative low spatial resolution available in PCBA-compatible manufacturing processes. Notably, the minimum feature size that can be patterned on a PCBA is significantly larger than the minimum feature size that can be patterned on an IC. This poses several challenges because it poses design constraints, and limits the ability to pattern small antennas and small antenna feeds. This problem is exacerbated when operating at frequencies in the millimeter wave range, due to the relatively small wavelength.

The inventors have developed several techniques for addressing the challenges arising from the use of PCBAs in connection with RF localization. In some embodiments, frequency selective surface (FSS) devices may be used to suppress (or at least attenuate) transverse surface waves that may otherwise couple the transmit antenna of a device directly to the receive antenna of the same device. FSS devices may be designed to give rise to a prohibited band (an RF frequency band in which electromagnetic energy is suppressed or at least attenuated, where electromagnetic energy outside the RF frequency band is transmitted with relatively low attenuation). In some embodiments, this may be achieved by arranging a plurality of structures according to a periodic two-dimensional lattice, where the periodicity of the lattice is selected so that the prohibited band substantially matches (or at least overlaps with) the emission band of the transmit antenna. Thus, some embodiments relate to an RF device comprising a substrate, where the substrate comprises a first RF antenna configured for wireless communication in a first RF band, a second RF antenna configured for wireless communication in a second RF band different from the first RF band, and an FSS device surrounding the second RF antenna. An RF device of this type may be arranged as an interrogator device and/or as a target device. The FSS device may surround the second RF antenna, or more generally, may be disposed adjacent the second RF antenna, such as between the first RF antenna and the second RF antenna, to block the direct electrical path connecting the antennas together. The FSS device is arranged to suppress electromagnetic energy present in the second RF band. As discussed above, the antennas may operate at different frequencies, thereby reducing the SNR. For example, the first RF band and the second RF band may be selected so that they do not spectrally overlap. In one specific example, the first RF antenna has a resonant frequency between 55 GHz and 65 GHz, and the second RF antenna has a resonant frequency between 110 GHz and 130 GHz. The RF device may further comprise an IC mounted on the same substrate, and coupled to both the first RF antenna and the second RF antenna. The IC comprises circuitry for processing signal in such a way to provide RF localization. For example, as discussed in detail below, the IC may comprises a frequency converter configured to, in response to receiving a first RF signal oscillating at a first carrier frequency from the first RF antenna, feed the second RF antenna with a second RF signal oscillating at a second carrier frequency different from the first carrier frequency. In some embodiments, the frequency converter may comprise a frequency multiplier (e.g., a frequency doubler), and the second carrier frequency may be approximately N times (e.g., twice) the first carrier frequency.

When the RF device is arranged as an interrogator device, the first RF antenna is configured to transmit a first RF signal having a first carrier frequency to a target device, and the second RF antenna is configured to receive, from the target device, a second RF signal having a second carrier frequency different from the first carrier frequency. Additionally, the IC is configured to provide to the first RF antenna the first RF signal having the first carrier frequency to be transmitted by the first RF antenna, and to process the second RF signal having the second carrier frequency received by the second RF antenna together with a reference version of the first RF signal having the first carrier frequency to obtain an RF signal indicative of a distance between the interrogator device and the target device.

When the RF device is arranged as a target device, the first RF antenna is configured to receive a first RF signal having a first carrier frequency from an interrogator device, and the second RF antenna is configured to transmit, to the interrogator device, a second RF signal having a second carrier frequency different from the first carrier frequency. Moreover, the IC is configured to receive the first RF signal from the first RF antenna, generate the second RF signal in response to receiving the first RF signal, and provide to the second RF antenna the second RF signal to be transmitted by the second RF antenna.

Further, the inventors have developed antennas that enable efficient transmission and reception notwithstanding the relatively large minimum feature size that can be patterned on PCBAs. These antennas involve the use of slots arranged for feeding the antennas. These slots enable the design of PCBAs in which the antennas are positioned on different conductive layers relative to the respective antenna feeds. Accordingly, the antennas and the antenna feeds may be optimized independently of one another, which results in a substantial increase in RF efficiency. Thus, some embodiments relate to an RF device comprising one or more substrates. Collectively, the one or more substrates comprise a first RF antenna configured for wireless communication in a first RF band, a second RF antenna configured for wireless communication in a second RF band different from the first RF band, a first slot and a second slot. The one or more substrates further comprise, collectively, a first antenna feed coupled to the first slot. The first antenna feed is configured to communicate with the first RF antenna through the first slot. The one or more substrates further comprise, collectively, a second antenna feed coupled to the second slot, where the second antenna feed is configured to communicate with the second RF antenna through the second slot. An RF device of this type may be arranged as an interrogator device and/or as a target device.

The one or more substrates may comprise a first substrate and a second substrate, where the first substrate comprises the first RF antenna, the first slot and the first antenna feed, and the second substrate comprises the second RF antenna, the second slot and the second antenna feed. The first and second substrates may be connected to one another, for example using bond wires. Alternatively, the one or more substrates may comprise a single substrate comprising the first and second RF antennas, the first and second slots and the first and second antenna feeds.

The slots may have any suitable shape. However, the inventors have appreciated that certain shapes are particularly effective at efficiently coupling energy between an antenna and an antenna feed notwithstanding the large minimum feature size. The shapes of the slots may be determined based on several considerations, including the resonant frequency of the respective antennas. Because in some embodiments the antennas have different resonant frequencies, the shapes of the slots may be different. In some embodiments, the first slot is L-shaped. The second slot is not L-shaped, and for example, is ring-shaped. In some embodiments, the first slot has a segmented contour (e.g., an L-shape contour, an H-shape contour, an E-shape contour, a T-shape contour, an F-shape contour, an I-shape contour, or suitable combinations thereof). In some embodiments, the second slot has a continuous contour (e.g., with an inner circular contour and/or an outer circular contour).

In some embodiments, the substrate further comprises a third antenna feed configured to communicate with the second RF antenna, where the second and third antenna feeds are configured to drive the second RF antenna differentially. As discussed above, use of differential signals may improve the localization accuracy. The substrate may further comprise a phase shifter coupled with the third antenna feed (e.g., where the phase shifter is arranged to produce a $\pm\pi/2$ phase shift between the second and third antenna feeds). In this way, the antenna may transmit (and/or receive) RF signals that are circularly polarized. As discussed above, use of circular polarization may reduce the negative effects of multipath propagation.

When the RF device is arranged as an interrogator device, the first RF antenna is configured to transmit a first RF signal having a first carrier frequency to a target device, and the second RF antenna is configured to receive, from the target device, a second RF signal having a second carrier frequency different from the first carrier frequency. Moreover, the IC is configured to provide to the first RF antenna the first RF signal having the first carrier frequency to be transmitted by the first RF antenna, and to process the second RF signal having the second carrier frequency received by the second RF antenna together with a reference version of the first RF signal having the first carrier frequency to obtain an RF signal indicative of a distance between the interrogator device and the target device.

When the RF device is arranged as a target device, the first RF antenna is configured to receive a first RF signal having a first carrier frequency from an interrogator device, and the second RF antenna is configured to transmit, to the interrogator device, a second RF signal having a second carrier frequency different from the first carrier frequency. Moreover, the IC is configured to receive the first RF signal from the first RF antenna, generate the second RF signal in response to receiving the first RF signal, and provide to the second RF antenna the second RF signal to be transmitted by the second RF antenna.

Further, in some embodiments, an RF device (e.g., an interrogator device or a target device) is designed to include a receive antenna and a transmit antenna formed on the same substrate, although the transmit antenna and the receive antenna are positioned on separate conductive layers of the substrate. Placing both antennas on the same substrate may increase the system's immunity to noise as it removes the need for bond wires or other inter-substrate connections. The presence of bond wires, in fact, introduces reactance (e.g., inductance or capacitance) in the path between antennas, thereby negatively affecting the performance of the system. Further, forming the antennas on different conductive layers of the same substrate enables designers to optimize the antennas independently from one another, which results in greater design flexibility. Thus, some embodiments relate to an RF device comprising a substrate, where the substrate comprises a first conductive layer patterned with a first patch antenna, a second conductive layer patterned with a second patch antenna, a third conductive layer having a first slot overlapping, at least partially, with the first patch antenna and a second slot overlapping, at least partially, with the second patch antenna, and a fourth conductive layer patterned with a first antenna feed overlapping, at least partially, with the first slot and a second antenna feed overlapping, at least partially, with the second slot. An RF device of this type may be arranged as an interrogator device and/or as a target device. The second conductive layer may be between the first conductive layer and the third conductive layer. The third conductive layer may be between the second conductive layer and the fourth conductive layer. The substrate may further comprise a core dielectric layer disposed between the first conductive layer and the fourth conductive layer. In some embodiments, the substrate further comprises a frequency selective structure formed on the second conductive layer. In some embodiments, the substrate further comprises an antenna via electrically coupled to the first patch antenna and passing through at least the second and third conductive layers.

In some embodiments, the RF device further comprises a printed circuit board on which the substrate is mounted, where the substrate further comprises a bottom via electrically coupling the printed circuit board to the fourth conductive layer. In some embodiments, the substrate further comprises a buried via electrically coupling the second patch antenna to the third conductive layer.

When the RF device is arranged as an interrogator device, the first patch antenna is configured to transmit a first RF signal having a first carrier frequency to a target device different from the RF device, and the second patch antenna is configured to receive, from the target device, a second RF signal having a second carrier frequency different from the first carrier frequency. Moreover, the RF device may further comprise an IC configured to provide to the first patch antenna the first RF signal having the first carrier frequency to be transmitted by the first RF antenna, and process the second RF signal having the second carrier frequency received by the second patch antenna together with a reference version of the first RF signal having the first carrier frequency to obtain an RF signal indicative of a distance between the RF device and the target device.

When the RF device is arranged as a target device, the first patch antenna is configured to receive a RF signal having a first carrier frequency from an interrogator device different from the RF device, and the second patch antenna is configured to transmit, to the interrogator device, a second RF signal having a second carrier frequency different from the first carrier frequency. Moreover, the IC is configured to receive the first RF signal from the first patch antenna, generate the second RF signal in response to receiving the first RF signal, and provide to the second patch antenna the second RF signal to be transmitted by the second patch antenna.

II. Micro-localization systems

FIG. 1A shows an illustrative system that may be used to implement RF localization techniques, in accordance with some embodiments of the technology described herein. Micro-localization system 100 comprises a plurality of interrogator devices 102, one or more of which are configured to transmit an RF signal 103 (e.g., RF signals 103*a*, 103*b*, 103*c*, etc.). System 100 also comprises one or more target devices 104 configured to receive RF signals 103 and, in response, transmit RF signals 105 (e.g., RF signals 105*a*, 105*b* and 105*c*, etc.). Interrogator devices 102 are configured to receive RF signals 105 that are then used to determine distances between respective interrogator and target devices. The computed distances may be used to determine the location of one or more target devices 104. It should be appreciated that while multiple target devices 104 are illustrated in FIG. 1A, a single target device may be utilized in some circumstances. More generally, it should be appreciated that any number of interrogator devices 102 and target devices 104 may be used, as the aspects of the technology described herein are not limited in this respect.

Micro-localization system 100 may also include a controller 106 configured to communicate with interrogator devices 102 and target devices 104 via communication channel 108, which may include a network, device-to-device communication channels, and/or any other suitable means of communication. Controller 106 may be configured to coordinate the transmission and/or reception of RF signals 103 and 105 between desired interrogator and target devices via communication channels 107*a*, 107*b* and 108, which may be a single communication channel or include multiple communication channels. Controller 106 may also be configured to determine the location of one or more target devices 104 from information received from interrogator devices 102. Controller 106 may be implemented as a standalone controller or may be implemented in full or in part by one or more interrogator devices 102 and/or target devices 104.

Figure 1B:
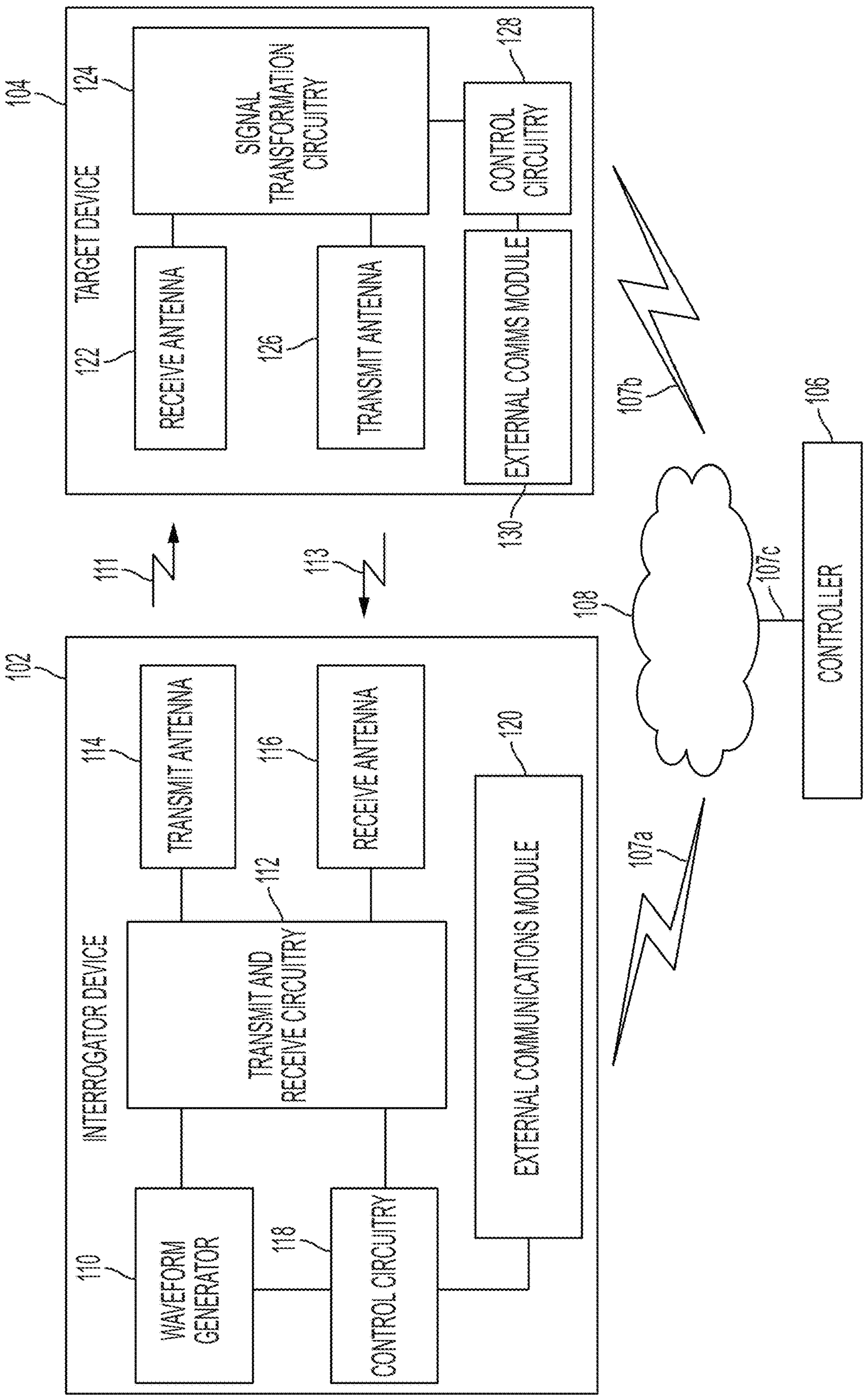
FIG. 1B is a block diagram of illustrative components of an interrogator device and a target device, which are part of the illustrative system shown in FIG. 1A, in accordance with some embodiments of the technology described herein.

FIG. 1B shows illustrative components of an illustrative interrogator device 102 and a illustrative target device 104, which are part of the illustrative system 100 shown in FIG. 1A, in accordance with some embodiments of the technology described herein. As shown in FIG. 1B, illustrative interrogator device 102 includes waveform generator 110, transmit and receive circuitry 112, transmit antenna 114, receive antenna 116, control circuitry 118, and external communications module 120. It should be appreciated that, in some embodiments, an interrogator device may include one or more other components in addition to or instead of the components illustrated in FIG. 1B. Similarly, in some embodiments, a target device may include one or more other components in addition to or instead of the components illustrated in FIG. 1B.

In some embodiments, waveform generator 110 may be configured to generate RF signals to be transmitted by the interrogator 102 using transmit antenna 114. Waveform generator 110 may be configured to generate any suitable type(s) of RF signals. In some embodiments, waveform generator 110 may be configured to generate frequency modulated RF signals, amplitude modulated RF signals, and/or phase modulated RF signals. Non-limiting examples of modulated RF signals, any one or more of which may be generated by waveform generator 110, include linear frequency modulated signals (also termed "chirps"), non-linearly frequency modulated signals, binary phase coded signals, signals modulated using one or more codes (e.g., Barker codes, bi-phase codes, minimum peak sidelobe codes, pseudo-noise (PN) sequence codes, quadri-phase codes, poly-phase codes, Costas codes, Welti codes, complementary (Golay) codes, Huffman codes, variants of Barker codes, Doppler-tolerant pulse compression signals, impulse waveforms, noise waveforms, and non-linear binary phase coded signals). Waveform generator 110 may be configured to generate continuous wave RF signals or pulsed RF signals. Waveform generator 110 may be configured to generate RF signals of any suitable duration (e.g., on the order of microseconds, milliseconds, or seconds).

In some embodiments, waveform generator 110 may be configured to generate microwave RF signals. For example, waveform generator 110 may be configured to generate RF signals having a center frequency between 1 GHz and 30 GHz (e.g., in the 4-7.5 GHz range or in the 8-15 GHz range, among other possible ranges). Alternatively, or additionally, waveform generator 110 may be configured to generate millimeter wave RF signals. For example, waveform generator 110 may be configured to generate RF signals having a center frequency between 30 GHz and 300 GHz (e.g., in the 50-70 GHz range or in the 110-130 GHz range, among other possible ranges). It should be appreciated that an RF signal having a particular center frequency is not limited to containing only that particular center frequency (the RF signal may have a non-zero bandwidth). For example, waveform generator 110 may be configured to generate a chirp having a center frequency of 60 GHz whose instantaneous frequency varies from a lower frequency (e.g., 59 GHz) to an upper frequency (e.g., 61 GHz). Thus, the generated chirp has a center frequency of 60 GHz and a bandwidth of 2 GHz and includes frequencies other than its center frequency.

In some embodiments, waveform generator 110 may be configured to generate RF signals using a phase locked loop. In some embodiments, the waveform generator may be triggered to generate an RF signal by control circuitry 118 and/or in any other suitable way.

In some embodiments, transmit and receive circuitry 112 may be configured to provide RF signals generated by waveform generator 110 to transmit antenna 114. Additionally, transmit and receive circuitry 112 may be configured to obtain and process RF signals received by receive antenna 116. In some embodiments, transmit and receive circuitry 112 may be configured to: (1) provide a first RF signal to the transmit antenna 114 for transmission to a target device (e.g., RF signal 111); (2) obtain a responsive second RF signal received by the receive antenna 116 (e.g., RF signal 113) and generated by the target device in response to the transmitted first RF signal; and (3) process the received second RF signal by mixing it (e.g., using a frequency mixer) with a transformed version of the first RF signal. The transmit and receive circuitry 112 may be configured to provide processed RF signals to control circuitry 118, which may (with or without performing further processing the RF signals obtained from circuitry 112) provide the RF signals to external communications module 120.

In some embodiments, transmit antenna 114 may be configured to radiate RF signals circularly polarized in one rotational direction (e.g., clockwise) and the receive antenna 116 may be configured to receive RF signals circularly polarized in another rotational direction (e.g., counter-clockwise). This scheme may reduce the effects of multipath propagation. In some embodiments, transmit antenna 114 may be configured to radiate RF signals having a first center frequency (e.g., RF signal 111 transmitted to target device 104) and the receive antenna may be configured to receive RF signals having a second center frequency different from (e.g., a harmonic of) the first center frequency (e.g., RF signal 113 received from target device 104 and generated by target device 104 in response to receiving the RF signal 111). This scheme may reduce interference between the RF signals, and as a result, increase the SNR.

In some embodiments, control circuitry 118 may be configured to trigger the waveform generator 110 to generate an RF signal for transmission by the transmit antenna 114. The control circuitry 118 may trigger the waveform generator in response to a command to do so received by external communications interface 120 and/or based on logic part of control circuitry 118.

In some embodiments, control circuitry 118 may be configured to receive RF signals from transmit and receive circuitry 112 and forward the received RF signals to external communications interface 120 for sending to controller 106. In some embodiments, control circuitry 118 may be configured to process the RF signals received from transmit and receive circuitry 112 and forward the processed RF signals to external communications interface 120. Control circuitry 118 may perform any of numerous types of processing on the received RF signals including, but not limited to, converting the received RF signals to from analog to digital (e.g., by sampling using an ADC), performing a Fourier transform to obtain a time-domain waveform, estimating a time of flight between the interrogator and the target device from the time-domain waveform, and determining an estimate of distance between the interrogator 102 and the target device that the interrogator 102 interrogated. The control circuitry 118 may be implemented in any suitable way and, for example, may be implemented as an application specific integrated circuit (ASIC), a field programmable gate array (FPGA), a combination of logic circuits, a microcontroller, or a microprocessor.

External communications module 120 may be of any suitable type and may be configured to communicate according to any suitable wireless protocol(s) including, for example, a Bluetooth communication protocol, an IEEE 802.15.4-based communication protocol (e.g., a "ZigBee" protocol), and/or an IEEE 802.11-based communication protocol (e.g., a "WiFi" protocol).

As shown in FIG. 1B, target device 104 includes receive antenna 122, signal transformation circuitry 124, transmit antenna 126, control circuitry 128, and external communications module 130.

In some embodiments, receive antenna 122 may be configured to receive RF signals circularly polarized in one rotational direction (e.g., clockwise) and the transmit antenna 126 may be configured to transmit RF signals circularly polarized in another rotational direction (e.g., counter-clockwise).

In some embodiments, receive antenna 122 may be configured to receive RF signals having a first center frequency. The received RF signals may be transformed by signal transformation circuitry 124 to obtained transformed RF signals having a second center frequency different from (e.g., a harmonic of) the first center frequency. The transformed RF signals having the second center frequency may be transmitted by transmit antenna 126.

In some embodiments, each of the transmit and/or the receive antennas on the target device may be isotropic so that the target device may be configured to receive signals from and/or provide RF signals to an interrogator located in any location relative to the target device. This is advantageous because, in some applications of micro-localization, the target device may be moving and its relative orientation to one or more interrogators may not be known in advance. However, in some embodiments, the antennas on a target device may be directional (anisotropic), as aspects of the technology describe herein are not limited in this respect. In some embodiments, control circuitry 128 may be configured to turn the target device 104 on or off (e.g., by powering off one or more components in signal transformation circuitry 124) in response to a command to do so received via external communications interface 130. The control circuitry 128 may be implemented in any suitable way and, for example, may be implemented as an application specific integrated circuit (ASIC), a field programmable gate array (FPGA), a combination of logic circuits, a microcontroller, or a microprocessor. External communications module 130 may be of any suitable type including any of the types described herein with reference to external communications module 120.

As described above with reference to FIG. 1A, multiple interrogator devices may be utilized in order to determine a location of a target device. In some embodiments, each of the interrogator devices may be configured to transmit an RF signal to a target device, receive a responsive RF signal from the target device (the responsive signal may have a different polarization and/or a different center frequency from the signal that was transmitted), and process the transmitted RF signal together with the received RF signal to obtain an RF signal indicative of the distance between the interrogator device and the target device. The RF signals indicative of the distances between the interrogator devices and the target device may be processed (e.g., by the interrogators or another processor) to obtain estimates of the distances between the target device and each of the interrogators. In turn, the estimated distances may be used to determine the location of the target device in 3D space.

In some embodiments, more than two interrogators may be used to interrogate a single target device. In such embodiments, estimates of distances between the target device and each of the three or more interrogators may be used to obtain the 2D location of the target devices (e.g. to specify a 2D plane containing the 3D target devices). When distances between at least three interrogator devices and a target device are available, then the 3D location of the target device may be determined.

III. Low-Cost Substrates for use with Interrogator and Target Devices

In some embodiments, RF localization devices (e.g., interrogator devices or target devices) may be manufactured using PCBAs, or more generally, using PCBA-compatible fabrication techniques. Use of PCBAs or PCBA-compatible fabrication techniques may reduce fabrication costs relative to more advanced technologies such as silicon ICs.

Figure 2:
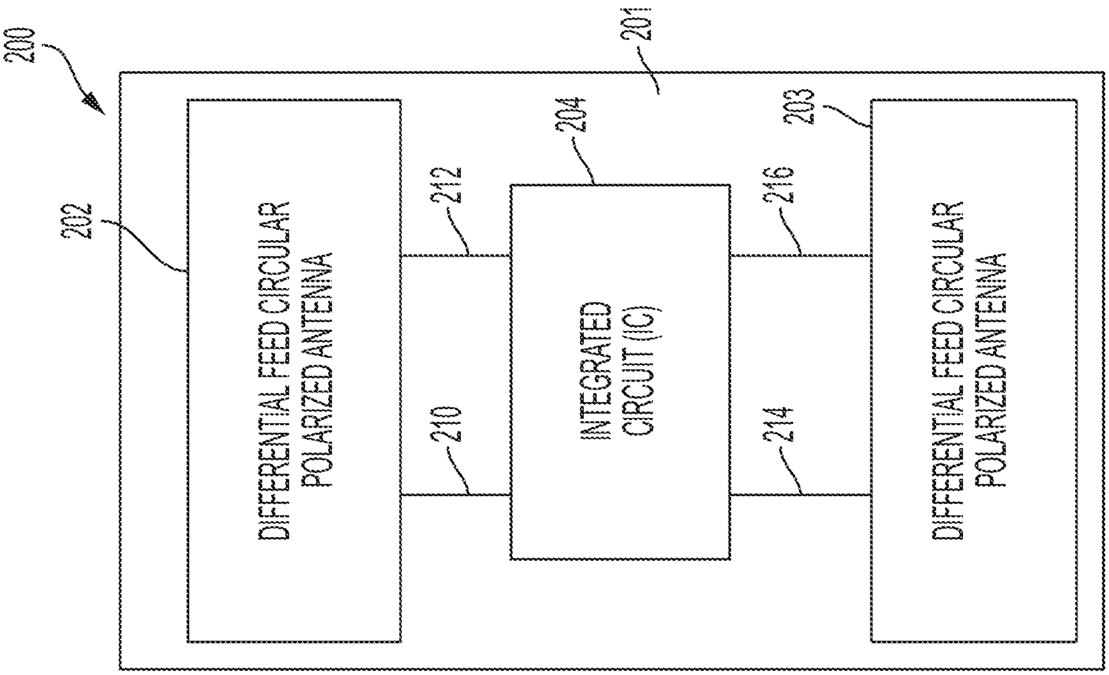
FIG. 2 is a block diagram illustrating an RF localization device formed according to printed circuit board assembly (PCBA) techniques, in accordance with some embodiments of the technology described herein.

FIG. 2 is a block diagram illustrating an RF localization device formed according to PCBA techniques, in accordance with some embodiments of the technology described herein. RF localization device 200 may implement part of an interrogator device 102 or part of a target device 104. As shown in FIG. 2, device 200 comprises a substrate 201, which may be implemented using materials commonly used in conventional PCBs. For example, substrate 201 may be made of FR-4 glass epoxy. Substrate 201 includes a differential feed circular polarized transmit antenna 202 and a differential feed circular polarized receive antenna 203 disposed thereon. The interrogator 200 further comprises integrated circuit (IC) 204 having transmit and receive circuitry integrated thereon. The transmit and receive circuitry integrated with the IC 204 is differentially coupled to antenna 202 via antennas feeds 210 and 212. The transmit and receive circuitry on the IC is also differentially coupled to antenna 203 via antenna feeds 214 and 216.

In one illustrative example, substrate 201 may be manufactured from materials that support propagation of microwave or millimeter wave signals having frequencies in the range of 0.5-20 GHz, 4-6 GHz, 8-12 GHz, 50-70 GHz, 100-140 GHz, 50 GHz-240 GHz, and/or any suitable frequency range within the union combination of such ranges.

In some embodiments, the substrate 201 may include one or more layers and/or coatings for reducing the harmonic coupling between the transmit and receive antennas on the substrate.

For example, the substrate 201 may include a frequency selective surface (FSS) device configured to reduce harmonic coupling between the transmit antenna 202 and the receive antenna 203. The FSS device may be manufactured as one or more layers within and/or on top of the substrate 201. The FSS device may be of any suitable type and, for example, may comprise a periodic array of (e.g., metallic) elements on a dielectric substrate. In some embodiments, the FSS device may attenuate undesired RF signals traveling across the substrate 201 between the two antennas 202 and 203. The FSS device may attenuate undesired RF signals by blocking their propagation across the substrate and reflecting them back toward the transmit antenna. For example, the FSS device may attenuate RF signals, traveling across substrate 201 from transmit antenna 202 to receive antenna 203, having a center frequency at a harmonic (e.g., 120 GHz) of the center frequency (e.g., 60 GHz) of signals being transmitted by antenna 202. Additionally or alternatively, the FSS device may attenuate coupling RF signals traveling between the differential lines 210 and 212, between the differential lines 214 and 216, and/or between ports of the die 508.

Accordingly, in some embodiments, the FSS device on substrate 201 may be tuned to blocking RF signals having a particular frequency or set of frequencies. For example, the FSS device may be tuned to block RF signals having frequencies (e.g., 120 GHz) that the receive antenna 203 is configured to receive from one or more target devices. Additionally or alternatively, the FSS device may be tuned to block RF signals having frequencies (e.g., 60 GHz) that the transmit antenna 202 is configured to transmit (e.g., to prevent the transmitter from potentially saturating the low-noise amplifier configured to amplify signals received by the receive antenna 203).

Figure 3B:
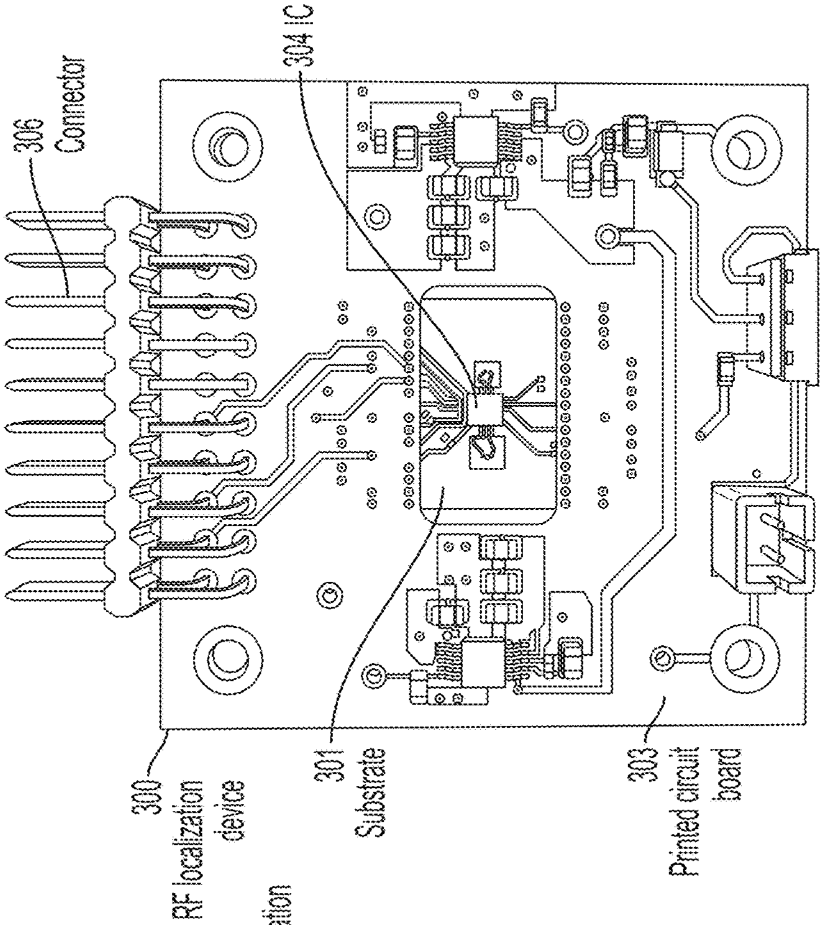
FIGS. 3A-3B are photographs showing the back-side and front-side, respectively, of an illustrative substrate which may be part of the illustrative device of FIG. 2, in accordance with some embodiments of the technology described herein.
Figure 3A:
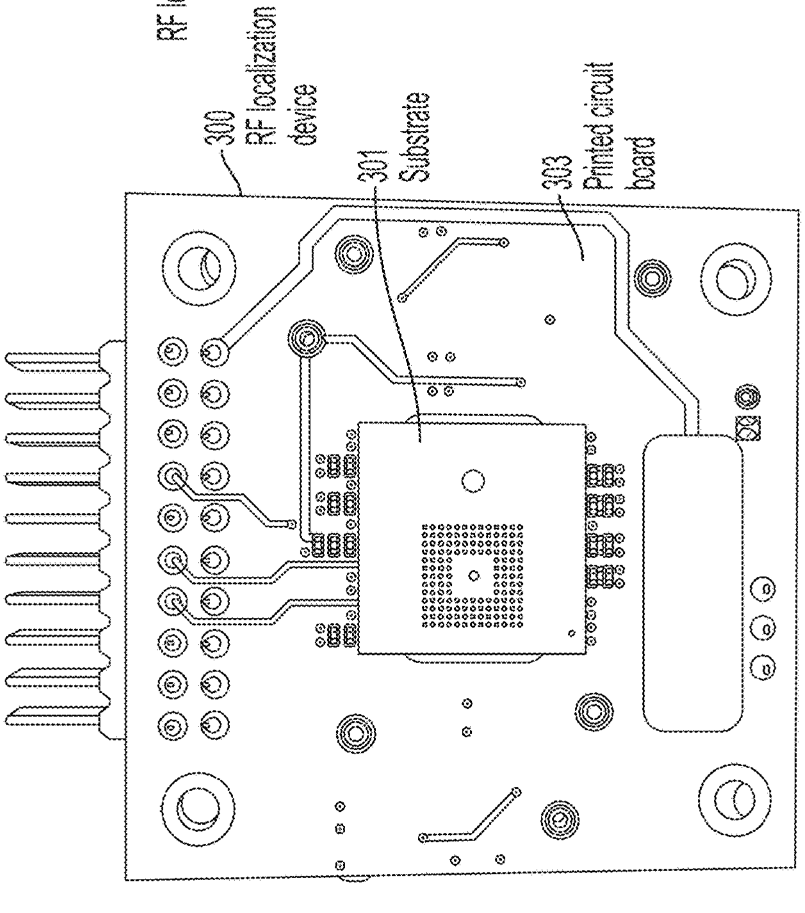

FIGS. 3A and 3B are photographs illustrating the bottom view and top view, respectively, of an example implementation of an RF localization device, in accordance with some embodiments of the technology described herein. RF localization device 300 includes a substrate implemented according to the diagram illustrated in FIG. 2. RF localization device 300 may be used to implement part of an interrogator device 102 and/or part of a target device 104. RF localization device 300 may be installed inside a housing to be mounting to an interrogator device or a target device.

RF localization device 300 includes a printed circuit board 303, and mounted to it, a substrate 301. In this implementation, printed circuit board 303 includes an opening formed there through, and substrate 301 is positioned so that its top surface is exposed to the opening. As illustrated in FIG. 3A, the top surface of substrate 301 is attached (e.g., by soldering or using an adhesive) to the bottom surface of printed circuit board 303. Substrate 301 may be fabricated using PCBA-compatible techniques. For example, substrate 301 may be made of (or otherwise include) a dielectric core layer (e.g., FR-4) and multiple conductive layers coupled to one another using vias. As discussed above, fabricating substrate 301 using PCBA-compatible techniques enables low-cost RF localization systems. An IC 304 is mounted to substrate 301. IC 304 may serve as IC 204 of FIG. 2 (which, in turn, may serve as control circuitry 118 and/or control circuitry 128 of FIG. 1B). As discussed in detail further below, substrate 301 includes a pair of RF antennas. In some embodiment, one antenna is configured as a transmit antenna (e.g., antenna 114 or antenna 126 of FIG. 1B) and one antenna is configured as a receive antenna (e.g., antenna 116 or antenna 122 of FIG. 1B).

In some embodiments, the antennas may be configured to operate in the millimeter waves. In some embodiments, one antenna is configured to operate at a higher frequency than the second antenna. For example, one antenna may have a resonant frequency between 55 GHz and 65 GHz, and the other antenna may have a resonant frequency between 110 GHz and 130 GHz.

Both antennas are coupled to IC 304. In at least some of the embodiments in which RF localization device 300 forms part of a target device, IC 304 may include a frequency doubler, or more generally, a frequency multiplier. The frequency doubler (multiplier) may be configured to receive an RF signal from the receive antenna, to double (multiply by N) the frequency of the received RF antenna, and to provide an RF signal having the double (or multiplied) frequency to the transmit antenna for transmission back to the interrogator device. In at least some of the embodiments in which RF localization device 300 forms part of an interrogator device, IC 304 may include a mixer for mixing the RF signal received at the receive antenna from the target device with a reference version of the RF signal transmitted to the target device, thereby obtaining an RF signal indicative of the time-of-flight between the interrogator device and the target device.

IC 304 is coupled to connector 306 using conductive traces patterned on substrate 301 as well as conductive traces patterned on printed circuit board 303. Connector 306 places IC 304 in communication with devices external to RF localization device 300, such as with external communications module 120 or external communications module 130 of FIG. 1B. Printed circuit board 303 may further include circuitry for providing a stable direct current (DC) supply voltage to IC 304.

Figure 4:
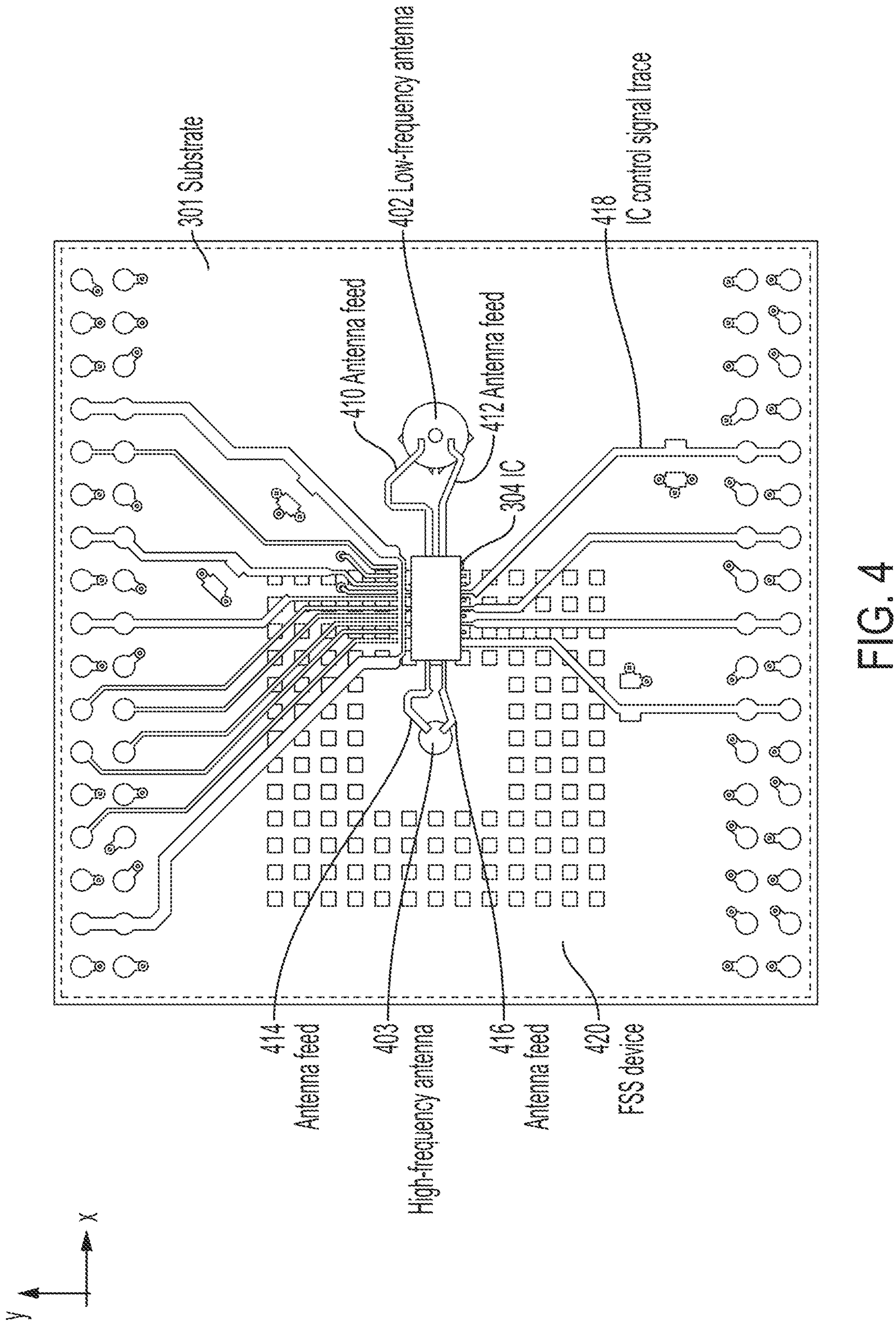
FIG. 4 is a front-side schematic diagram of the illustrative substrate of FIGS. 3A-3B, in accordance with some embodiments of the technology described herein.

FIG. 4 is a schematic diagram illustrating the top surface of a substrate 301, in accordance with some embodiments of the technology described herein. As shown in this figure, substrate 301 includes IC 304, a low-frequency antenna 402, a high-frequency antenna 403, antenna feeds 410, 412, 414 and 416, an FSS device 420 and IC control signal traces 418. IC control signal traces 418 may be coupled to connector 306 (shown in FIG. 3B).

The designations "low-frequency antenna" and "high-frequency antenna" are used to indicate that one antenna (the low-frequency antenna) is configured to operate at a lower frequency relative to the other antenna (the high-frequency antenna). The frequencies of operation of the low-frequency antenna and the high-frequency antenna may be selected based on a variety of design considerations, including for example the spatial resolution required in a particular application. In some embodiments, low-frequency antenna 402 has a resonant frequency between 55 GHz and 65 GHz, and high-frequency antenna 403 has a resonant frequency between 110 GHz and 130 GHz. Other ranges are also possible. In some embodiments, the antennas are implemented as patch antennas of any suitable shape (e.g., circular). Antennas feeds 410, 412, 414 and 416 may serve as antennas feeds 210, 212, 214 and 216 (FIG. 2), respectively. Thus, antenna feeds 410 and 412 place IC 304 in communication, in a differential fashion, with low-frequency antenna 402. Similarly, antenna feeds 414 and 414 place IC 304 in communication, in a differential fashion, with high-frequency antenna 403. IC 304 may include circuitry for generating single-ended signals based on the differential signals obtained from the pairs of differential antenna feeds. For example, IC 304 may include circuitry for subtracting the signal of a first antenna feed of a pair from the signal of a second antenna feed of the pair.

As discussed above, in some embodiments, the antennas may be configured to transmit and receive circularly polarized signals. To enable the circular polarization, a phase shifter may be positioned along the path of one antenna feed of the differential pair. The amount of phase shift may be set to produce the desired polarization. For example, the phase shifter may be a $\pi/2$-phase shifter to produce circular polarization. In some embodiments, the phase shifter may be implemented by increasing the length of one antenna feed of a pair relative to the other antenna feed of the pair. In the implementation of FIG. 4, for example, antenna feed 410 includes a jogged portion that makes antenna feed 410 longer than antenna feed 412. Antenna feed 414 also includes a jogged portion that makes antenna feed 414 longer than antenna feed 416. The difference between the lengths of the antenna feeds of a pair is selected to provide the desired phase shift, and therefore, the desired polarization, at the frequency of interest. Other types of phase shifters may alternatively be used.

Placing both antennas on the same substrate is advantageous because doing so limits the reactance, and as a result the attenuation, associated with the conductive paths connecting IC 304 to the antennas. However, this configuration has a drawback, namely that part of the electromagnetic energy produced by the high-frequency antenna may inadvertently couple directly to the low-frequency antenna, thereby reducing the SNR with which the low-frequency antenna receives RF signals from outside substrate 301. When high-frequency antenna 403 is excited using antenna feeds 414 and 416, the majority of the energy released by the antenna is emitted in the desired direction, i.e., outside the plane of substrate 301. However, a fraction of the energy released by the antenna excites surface waves propagating in the plane of substrate 301. The energy associated with the surface waves depends, among other factors, on the dielectric constant of the dielectric core layer and on the thickness of the dielectric core layer. The lower the dielectric constant, the greater the energy of the surface waves. Similarly, the smaller the thickness of the dielectric core layer, the greater the energy of the surface waves. Unfortunately, having both a relatively low dielectric constant and a relatively thin dielectric core layer is desirable because it reduces manufacturing costs. Thus, in some embodiments, an FSS device may be used to suppress (or least attenuate) the surface waves emitted by the high-frequency antenna, thereby preventing them from reaching the low-frequency antenna. As shown in FIG. 4, FSS device 420 includes a plurality of structures arranged in a two-dimensional periodic lattice. The periodicities of the lattice along the x-axis and the y-axis are selected to give rise to a prohibited band that substantially matches (or at least overlaps with) the emission band of the high-frequency antenna. For example, in embodiments in which the high-frequency antenna is configured to transmit at 120 GHz, the prohibited band may span from 115 GHz to 125 GHz. In the implementation of FIG. 4, FSS device 420 surrounds the high-frequency antenna, thereby attenuating surface waves emitted in any planar direction. FSS device 420 may surround the high-frequency antenna in any of numerous ways. For example, FSS device 420 may be disposed around the perimeter (e.g., circumferentially) of the high-frequency antenna. FSS device 420 may be disposed around the entire perimeter of the high-frequency antenna, or around a portion of the perimeter of the high-frequency antenna. FSS device 420 may surround the high-frequency antenna in two or three dimensions. In the example of FIG. 4, FSS device 420 surrounds the high-frequency antenna in two dimensions, in the xy-plane. FSS device 420 may include four blocks of structures arranged in a two-dimensional periodic lattice. The first block is positioned north of the high-frequency antenna, the second block is positioned east of the high-frequency antenna, the third block is positioned south of the high-frequency antenna, and the fourth block is positioned west of the high-frequency antenna (where north, east, south and west are defined with reference to the xy-plane). In other embodiments, FSS device 420 may include fewer than four such blocks, such as three blocks. It should be appreciated that FSS device 420 need not surround high-frequency antenna 403. In other embodiments, for example, an FSS device may be arranged to block surface waves propagating in the x-axis direction without attenuating surface waves propagating in the y-axis direction. For example, an FSS device may be positioned between high-frequency antenna 403 and low-frequency antenna 402.

As discussed above, fabricating RF localization devices using PCBA-compatible techniques leads to relatively large minimum feature sizes. Given the relatively high frequency of operation of RF localization device 300, this poses a major constraint in the design of the antennas. In some embodiments, slot-fed antennas may be used to enable efficient transmission and reception of RF signals notwithstanding the relatively large minimum feature size that can be patterned on PCBAs. These antennas involve the use of slots for feeding the antennas. These slots enable the design of PCBAs in which the antennas are positioned on different conductive layers relative to the respective antenna feeds. Accordingly, the antennas and the antenna feeds may be optimized independently of one another, which results in a substantial increase in design flexibility, and as a further result, in RF efficiency. FIG. 5A is an isometric view of a substrate 301 including slot-fed antennas, in accordance with some embodiments of the technology described herein. In the implementation of FIG. 5A, both antennas are coupled to the respective antenna feeds through slots formed through the substrate. Low-frequency antenna 402 is coupled to the respective antenna feeds (not shown in FIG. 5A) through slot 502. Similarly, high-frequency antenna 403 is coupled to the respective antenna feeds (not shown in FIG. 5A) through slot 504. In this configuration, RF energy crosses the slot while traveling between an antenna and the respective antenna feeds in a direction outside the plane of substrate 301. The shapes of slots 502 and 504 may be chosen based on several considerations, including the resonant frequency of the respective antennas. Because the antennas have different resonant frequencies, the shapes of the slots may be different from one another. In some embodiments, slot 502 is L-shaped. In some embodiments, slot 504 is not L-shaped, and for example, is ring-shaped. In some embodiments, slot 502 has a segmented contour (e.g., an L-shape contour, an H-shape contour, an E-shape contour, a T-shape contour, an F-shape contour, an I-shape contour, or suitable combinations thereof). In some embodiments, slot 504 has a continuous contour (e.g., with an inner circular contour and/or an outer circular contour).

Figure 5B:
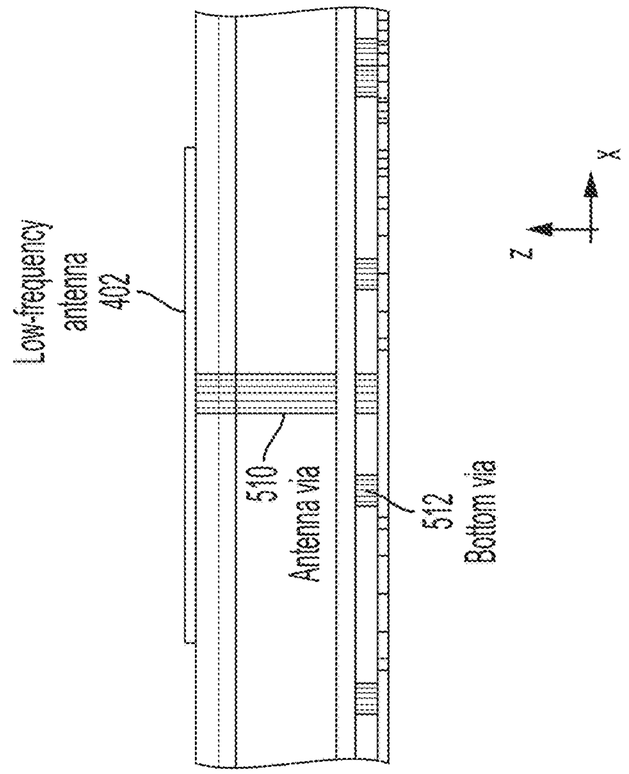
FIG. 5B is a cross sectional schematic diagram showing a portion of the illustrative substrate of FIGS. 3A-3B, in accordance with some embodiments of the technology described herein.
Figure 5A:
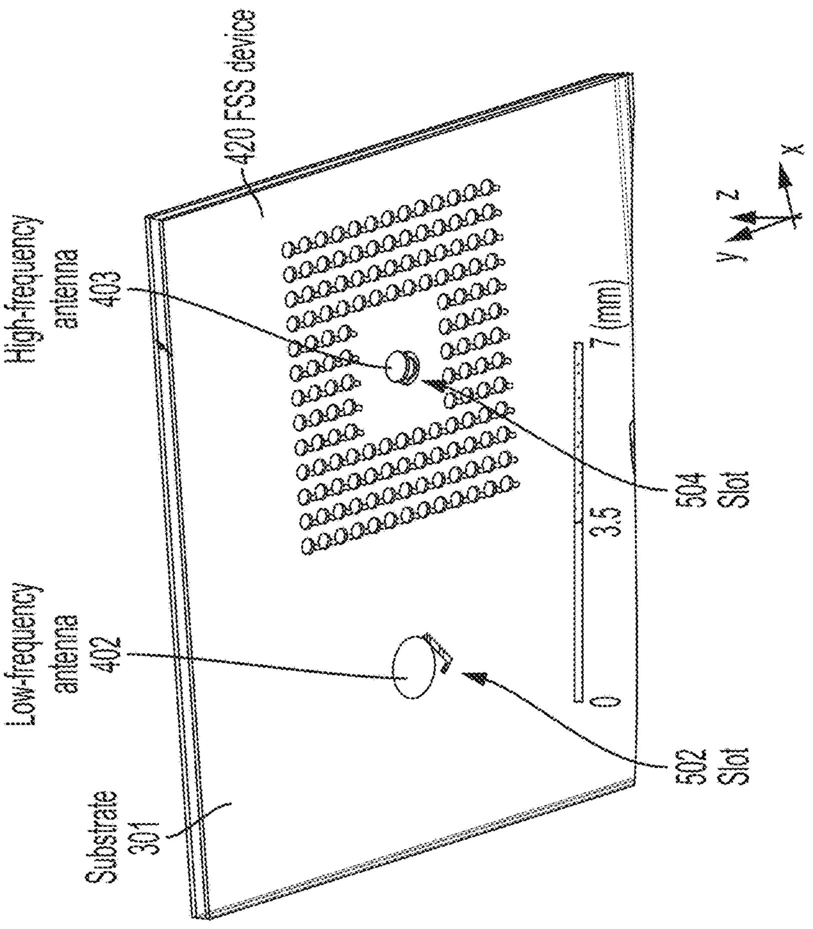
FIG. 5A is an isometric schematic diagram of the illustrative substrate of FIGS. 3A-3B, in accordance with some embodiments of the technology described herein.

FIG. 5B depicts a cross section of a portion of substrate 301, in accordance with some embodiments of the technology described herein. In this example, low-frequency antenna 402 includes a patch antenna suspended above the top surface of substrate 301 and connected to the bottom of the substrate by an antenna via 510. As discussed further below, bottom vias 512 may be used for direct current (DC) connections to the IC (or for any other suitable purpose).

Figure 6:
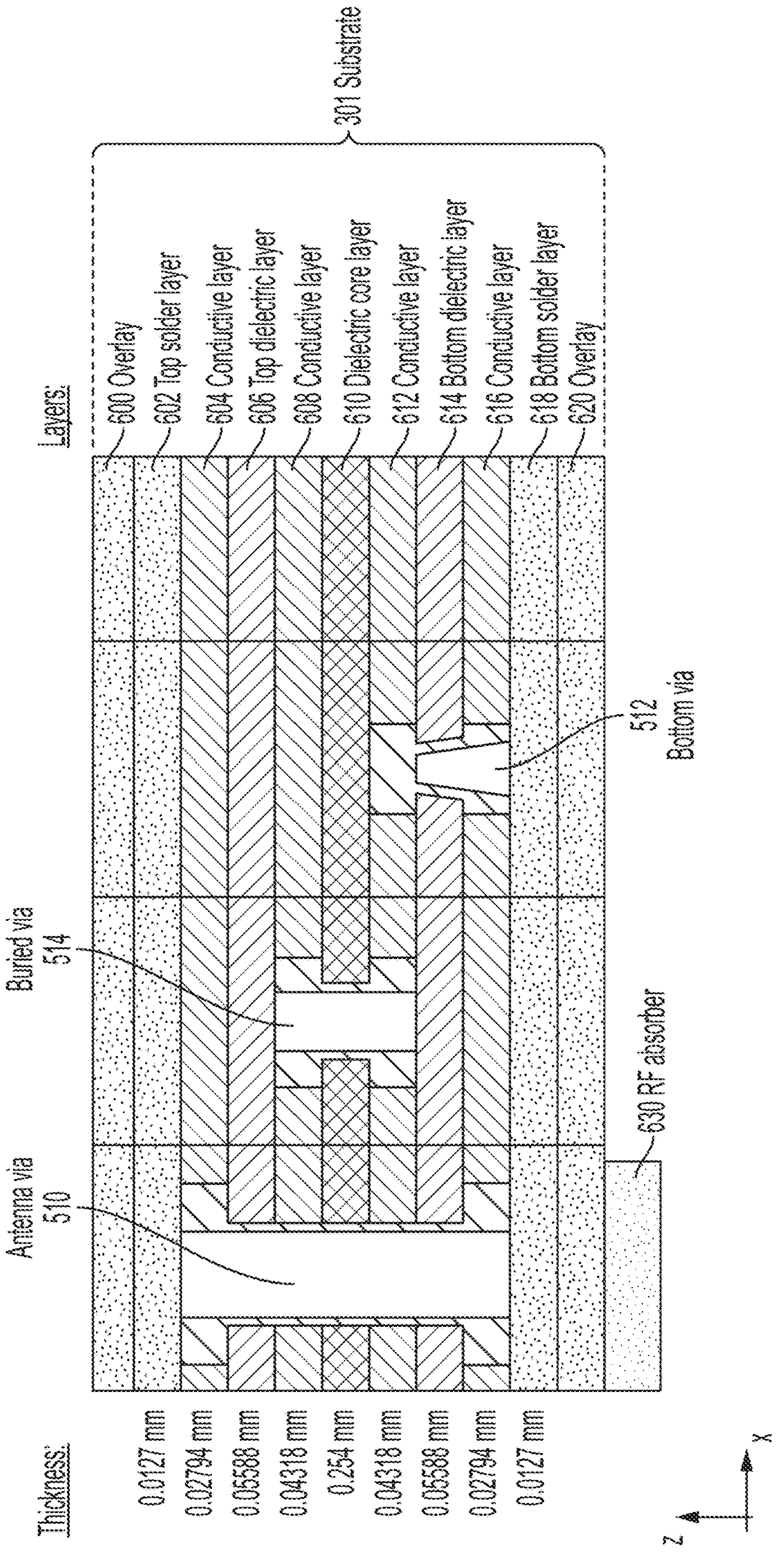
FIG. 6 is a cross sectional schematic diagram showing another portion of the illustrative substrate of FIGS. 3A-3B, in accordance with some embodiments of the technology described herein.

FIG. 6 depicts another cross section of a substrate 301, in accordance with some embodiments of the technology described herein. In this example, substrate 301 includes the following layers: an overlay layer 600, a top solder layer 602, a first conductive layer 604, a top dielectric layer 606, a second conductive layer 608, a dielectric core layer 610, a third conductive layer 612, a bottom dielectric layer 614, a fourth conductive layer 616, a bottom solder layer 618 and another overlay layer 620. Example thicknesses associated with these layers are shown in FIG. 6, though other values are also possible. One or more RF absorbers 630 may be used to block radiation emitted by one of the antennas (or both) in the downward direction.

Antenna via 510 (also referred to as "thru-substrate via") connects the fourth conductive layer 616 to the first conductive layer 604. Antenna via 510 supports low-frequency antenna 402 and suspends it above the top surface of the substrate. Buried via 514 connects the second conductive layer 608 to the third conductive layer 612. As shown in FIG. 6, this via is buried in that it is disposed between first conductive layer 604 and fourth conductive layer 616. Buried via 514 supports high-frequency antenna 403. The bottom via 512 connects the fourth conductive layer 616 to the IC (not shown in FIG. 6).

The first, second, third and fourth conductive layers may be patterned according to the configurations shown in FIGS.

Figure 7A:
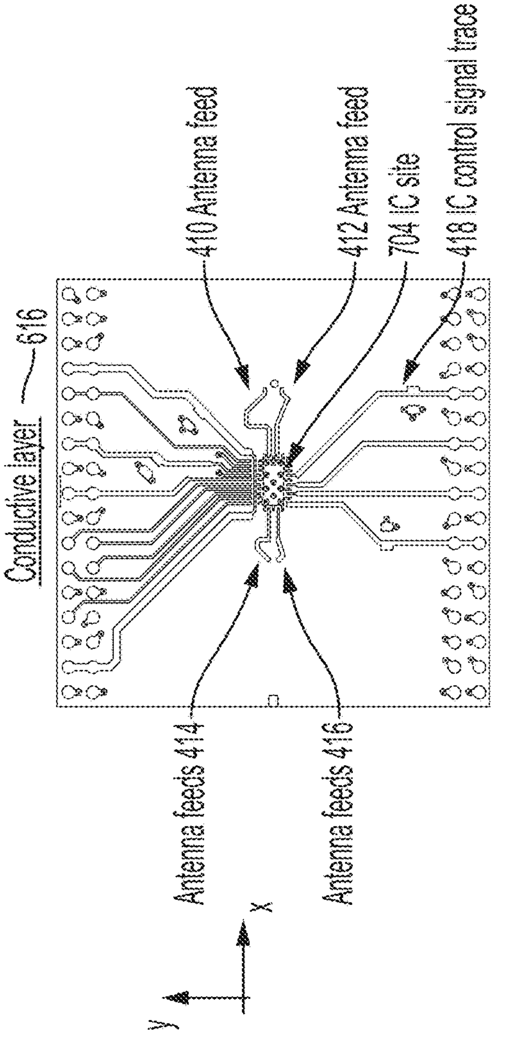
FIGS. 7A-7D are front-side schematic diagrams of the conductive layers shown in FIG. 6, in accordance with some embodiments of the technology described herein.
Figure 7B:
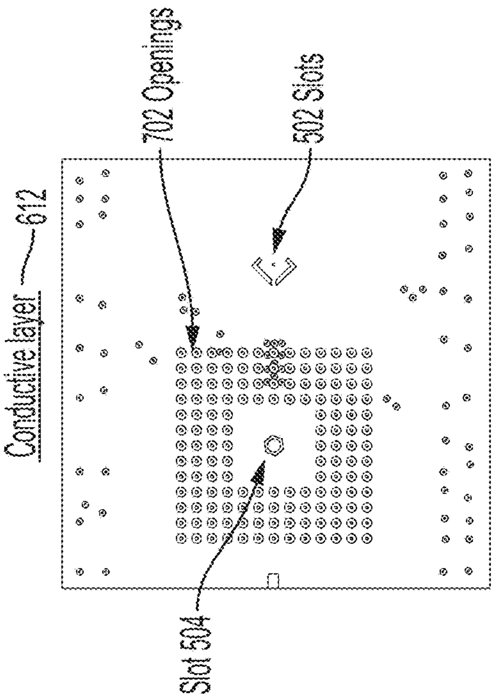
Figure 7C:
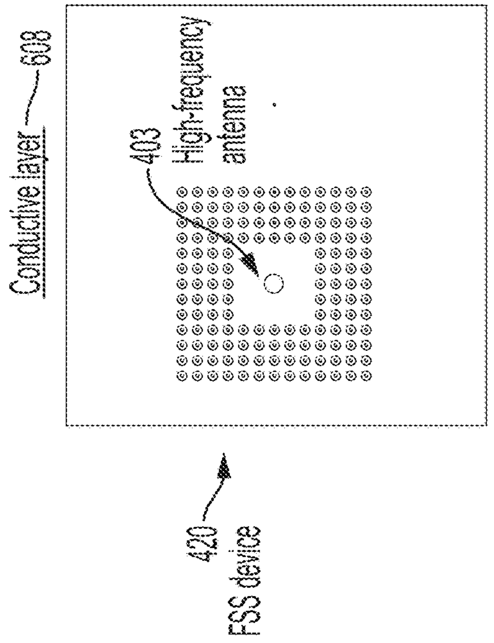
Figure 7D:
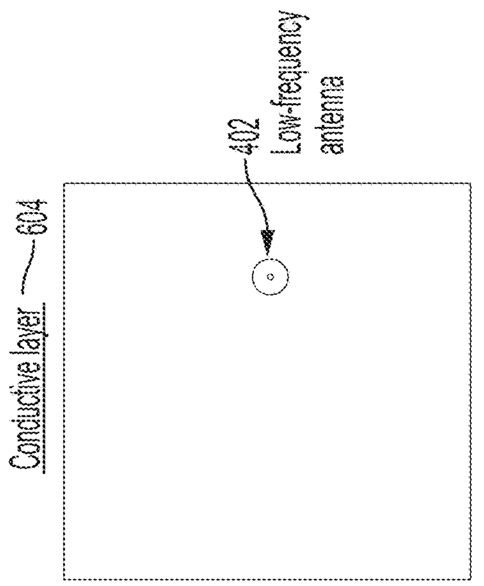

7D, 7C, 7B and 7A, respectively, in accordance with some embodiments of the technology described herein. As shown in FIG. 7A, fourth conductive layer 616 is patterned to form antenna feeds 410, 412, 414 and 416, as well traces for routing the signals of IC 304 (at IC site 704) and IC control signal traces 418. The way in which third conductive layer 612 (which in some embodiments serves as the ground plane) is patterned is shown in FIG. 7B. This layer includes a sheet of conductive material, through which slots 502 and 504, as well as openings 702, are formed. The sheet of conductive material generally blocks RF energy traveling outside the plane of substrate 301, but it allows passage of RF energy through the slots, as discussed above. Openings 702 accommodate vias supporting the structures of FSS device 420. As shown in FIG. 7C, second conductive layer 608 is patterned to form high-frequency antenna 403 and the structures that form FSS device 420. As shown in FIG. 7D, second conductive layer 604 is patterned to form low-frequency antenna 402.

Figure 8:
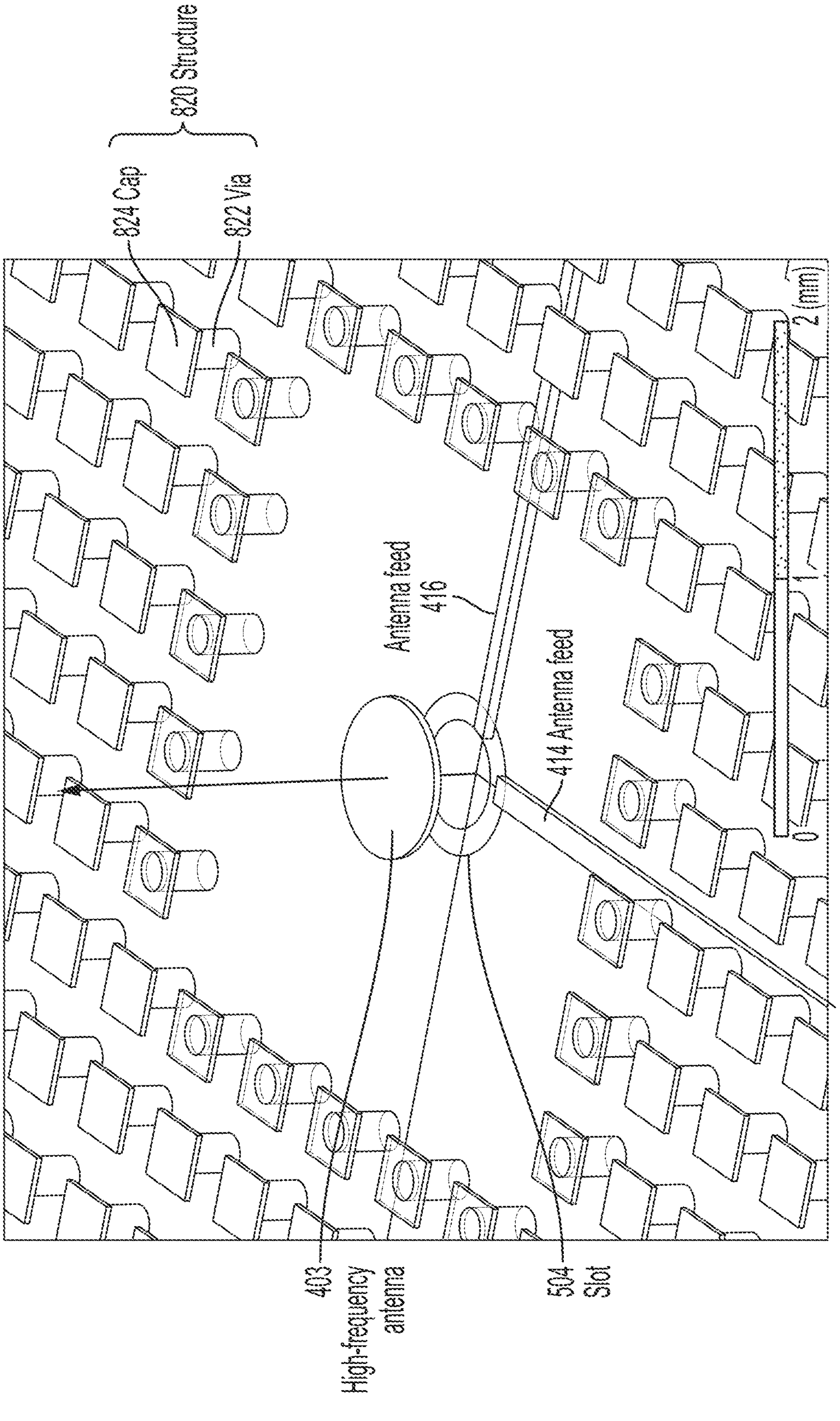
FIG. 8 is an isometric schematic diagram showing a high-frequency antenna, in accordance with some embodiments of the technology described herein.

FIG. 8 depicts the high-frequency antenna in additional detail, in accordance with some embodiments of the technology described herein. Antenna feeds 414 and 416 are coupled to slot 504, which in this example, is ring-shaped. RF energy is coupled between the antenna feeds and the high-frequency antenna by free space propagation through the slot. FIG. 8 further depicts FSS device 420 in additional detail. FSS device comprises a plurality of structures 820 arranged in a two-dimensional lattice. In this example, each structure 820 is arranged substantially in the shape of a mushroom: a via 822 supports a cap 824. Via 822 passes through openings 702 (FIG. 7B) and caps 824 are formed on second conductive layer 608.

Figure 9:
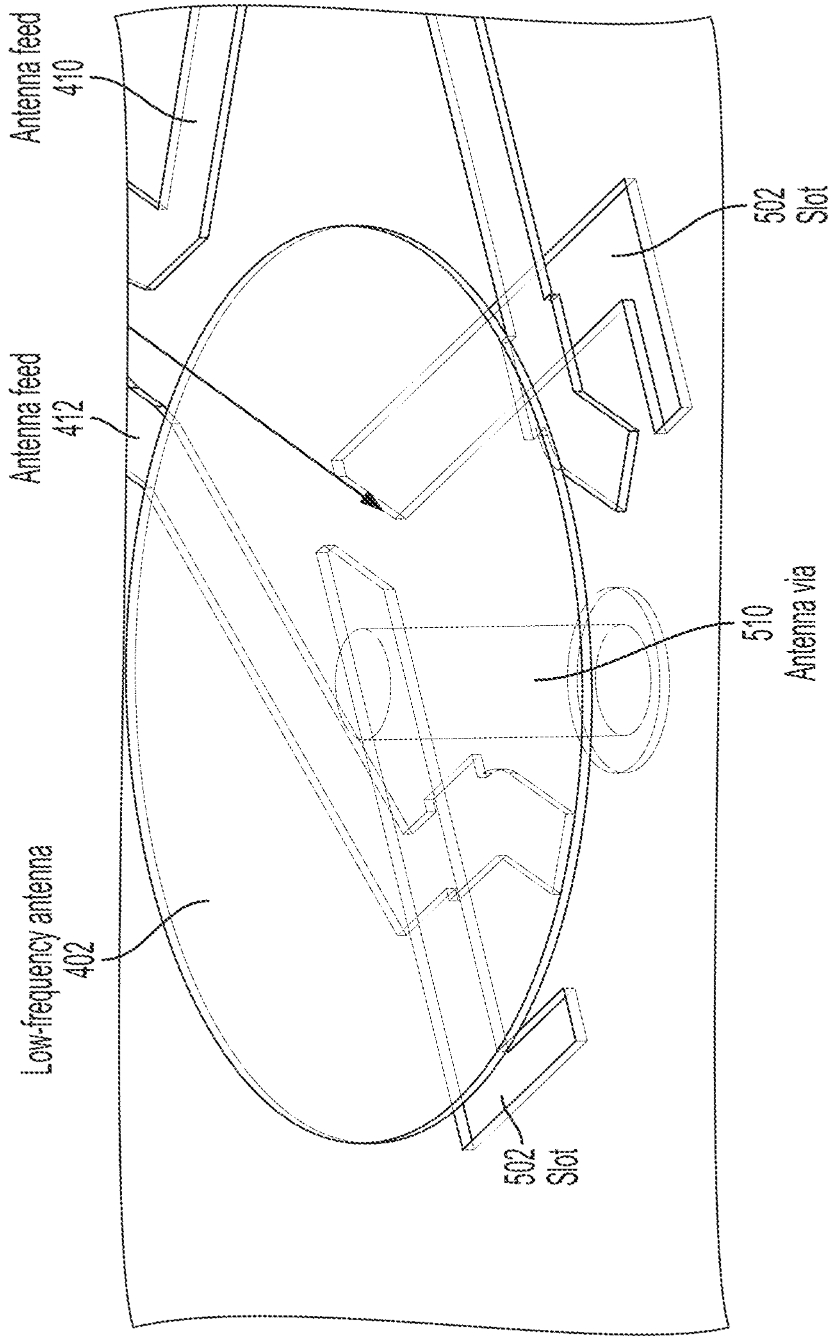
FIG. 9 is an isometric schematic diagram showing a low-frequency antenna, in accordance with some embodiments of the technology described herein.

FIG. 9 depicts the low-frequency antenna in additional detail, in accordance with some embodiments of the technology described herein. Antenna feeds 410 and 412 are coupled to low-frequency antenna 402 through a pair of slot 502, which in this example, are L-shaped. RF energy is coupled between the antenna feeds and the high-frequency antenna by free space propagation through the slots 502. As discussed above in connection with FIG. 5B, via 510 supports low-frequency antenna 402.

Figure 10A:
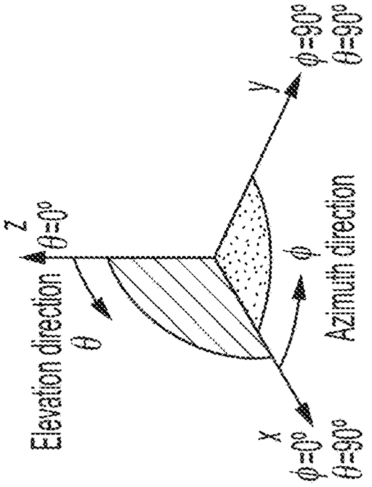
FIG. 10A is a schematic diagram showing a three-dimensional coordinate system, in accordance with some embodiments of the technology described herein.
Figure 10B:
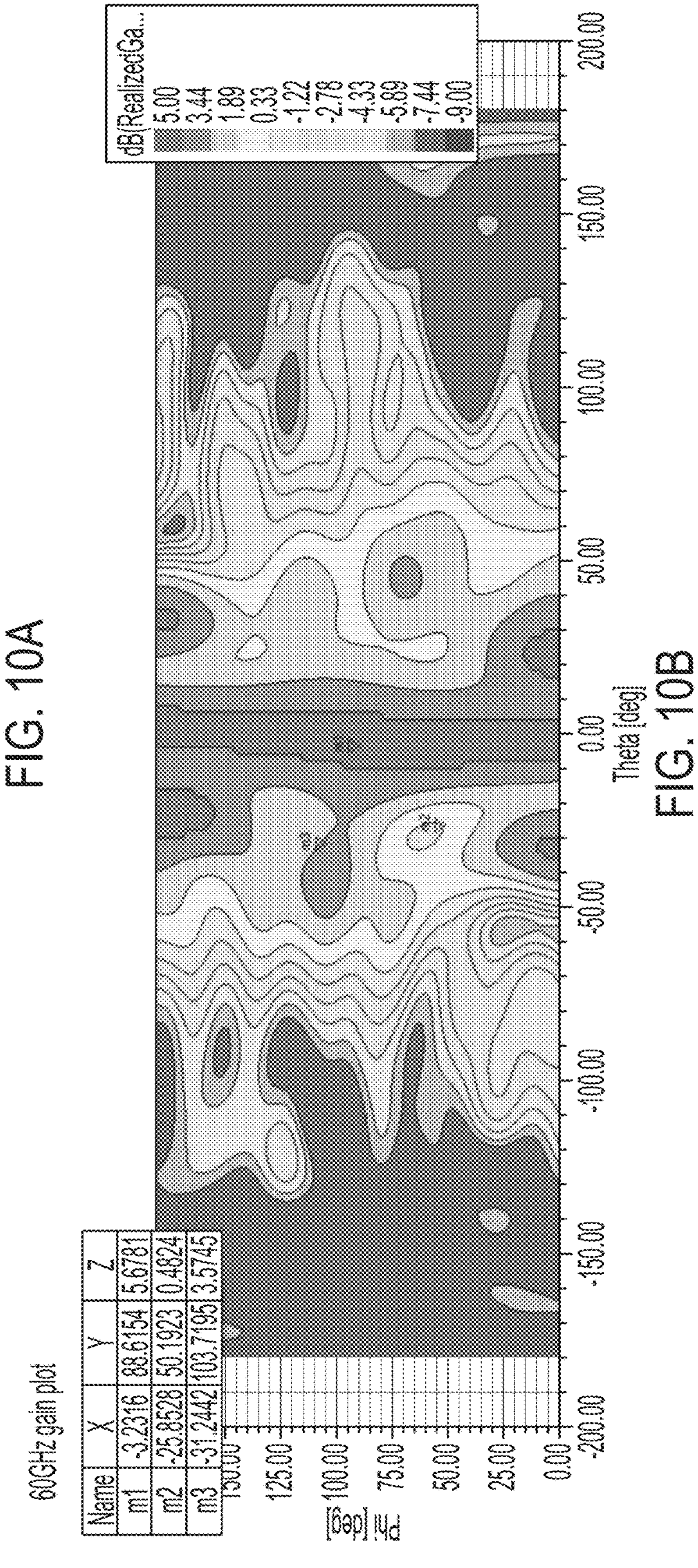
FIG. 10B is a plot showing a radiation diagram associated with the low-frequency antenna of FIG. 9, in accordance with some embodiments of the technology described herein.
Figure 10C:
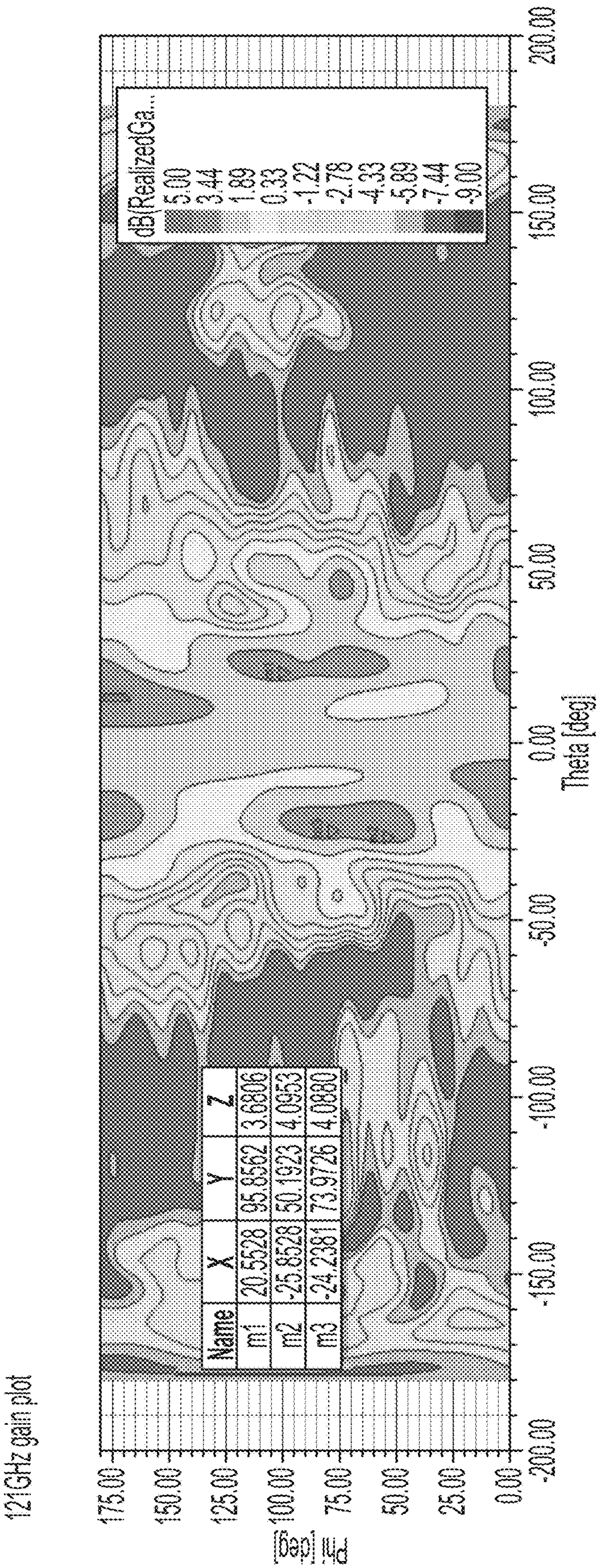
FIG. 10C is a plot showing a radiation diagram associated with the high-frequency antenna of FIG. 8, in accordance with some embodiments of the technology described herein.

FIG. 10 illustrates a reference coordinate system. FIG. 10B is a plot depicting an illustrative radiation diagram associated with low-frequency antenna 402 at 60 GHz, in accordance with some embodiments of the technology described herein. FIG. 10C is a plot depicting an illustrative radiation diagrams associated with high-frequency antenna 403 at 121 GHz, in accordance with some embodiments of the technology described herein. The diagrams of FIGS. 10B and 10B are plotted against the coordinate system of FIG. 10A. These diagrams illustrate that both antennas exhibit relatively large fields of view, which is particularly useful in applications in which the location of a target device is expected to vary substantially over time. Referring first to FIG. 10B, the radiation diagram of low-frequency antenna 402 is generally uniform with respect to the azimuth direction (Φ). Importantly, the radiation diagram of low-frequency antenna 402 is also uniform with respect to the elevation direction (θ), at least in the region approximately between −45 degrees and 45 degrees. This means that the antenna has a field of view of at least 90 degrees. Referring first to FIG. 10C, the radiation diagram of high-frequency antenna 403 is also generally uniform with respect to the azimuth direction (Φ). Importantly, the radiation diagram of high-frequency antenna 403 is also uniform with respect to the elevation direction (θ), at least in the region approximately between −35 degrees and 35 degrees. This means that the antenna has a field of view of at least 70 degrees.

Figure 11B:
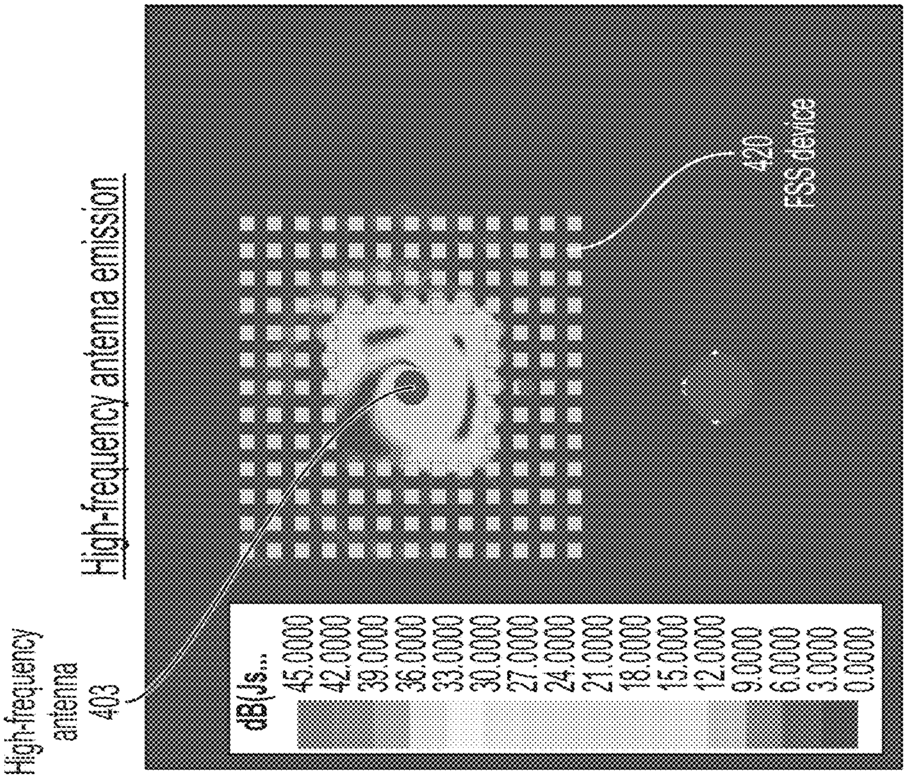
FIG. 11B is another plot showing a radiation diagram associated with the high-frequency antenna of FIG. 8, in accordance with some embodiments of the technology described herein.
Figure 11A:
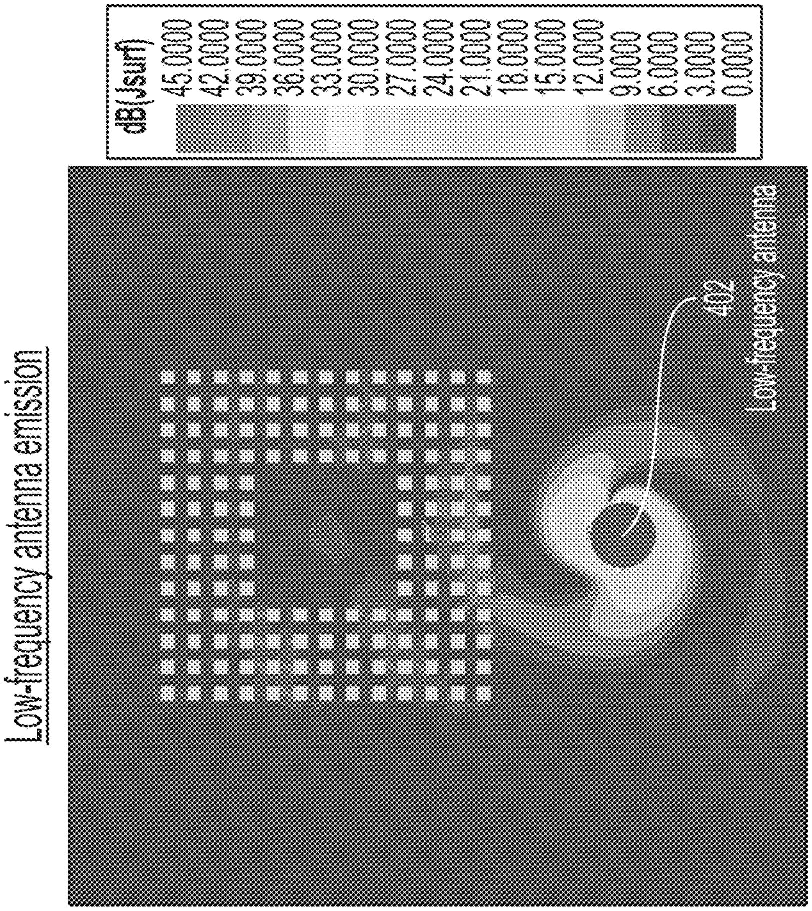
FIG. 11A is another plot showing a radiation diagram associated with the low-frequency antenna of FIG. 9, in accordance with some embodiments of the technology described herein.

FIG. 11A illustrates the field emitted by low-frequency antenna 402 in the plane of the substrate, in accordance with some embodiments of the technology described herein. FIG. 11B illustrates the field emitted by high-frequency antenna 403 in the plane of the substrate, in accordance with some embodiments of the technology described herein. As shown in FIG. 11B, FSS device 420 blocks surface waves propagating in the plane of the substrate, thereby preventing these waves from reaching low-frequency antenna 402.

Figure 12A:
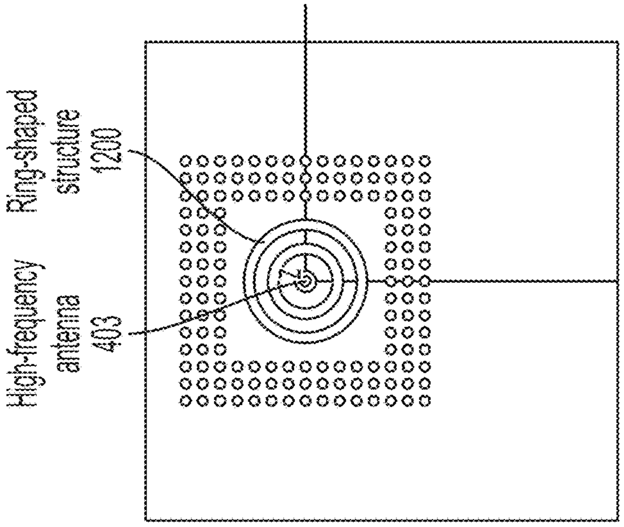
FIG. 12A is a front-side schematic diagram of a substrate including a ring-shaped structure, in accordance with some embodiments of the technology described herein.
Figure 12B:
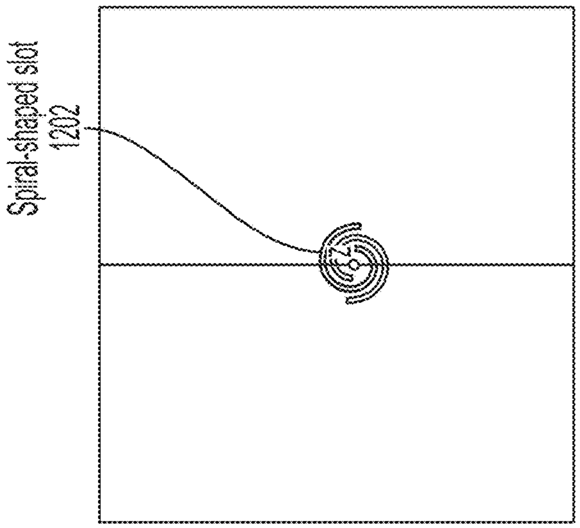
FIG. 12B is a front-side schematic diagram of a substrate including a spiral-shaped slot, in accordance with some embodiments of the technology described herein.
Figure 12C:
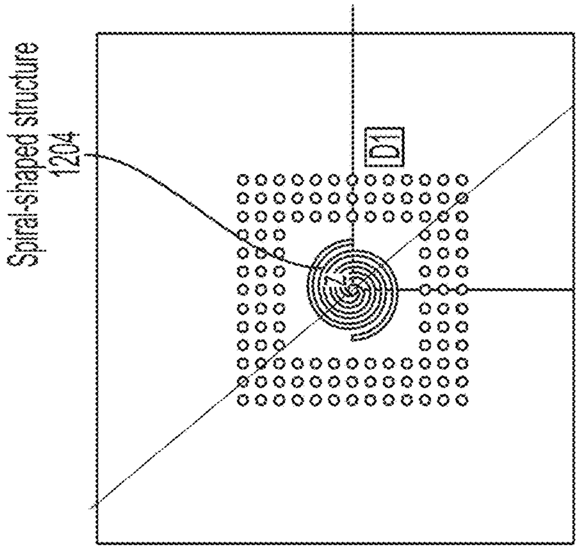
FIG. 12C is a front-side schematic diagram of a substrate including a spiral-shaped structure, in accordance with some embodiments of the technology described herein.

FIGS. 12A, 12B and 12C illustrate additional structures that may be used in connection with the substrate, in accordance with some embodiments of the technology described herein. In the example of FIG. 12A, a plurality of conductive rings 1200 surround the high-frequency antenna 403. The conductive rings 1200 may be formed on any layer of the substrate, including for example in conductive layer 604 and/or conductive layer 608. Structure 1200 may be positioned to further block surface waves. In the example of FIG. 12B, spiral-shaped slots 1202 are used to couple the antenna feeds to the high-frequency antenna. In the example of FIG. 12C, a spiral-shaped structure 1204 surrounds the high-frequency antenna. The structure may be made of dielectric or conductive material. Structure 1204 may be positioned to further block surface waves.

In some embodiments, a via fence may be used to suppress radiation emitted from the high-frequency antenna 403. A via fence of the types described herein may include a structure that surrounds high-frequency antenna 403. The via fence may surround the high-frequency antenna in any of numerous ways. For example, the via fence may be disposed around the perimeter (e.g., circumferentially) of the high-frequency antenna. The via fence may be disposed around the entire perimeter of the high-frequency antenna, or around a portion of the perimeter of the high-frequency antenna. The via fence may surround the high-frequency antenna in two or three dimensions.

Figure 12D:
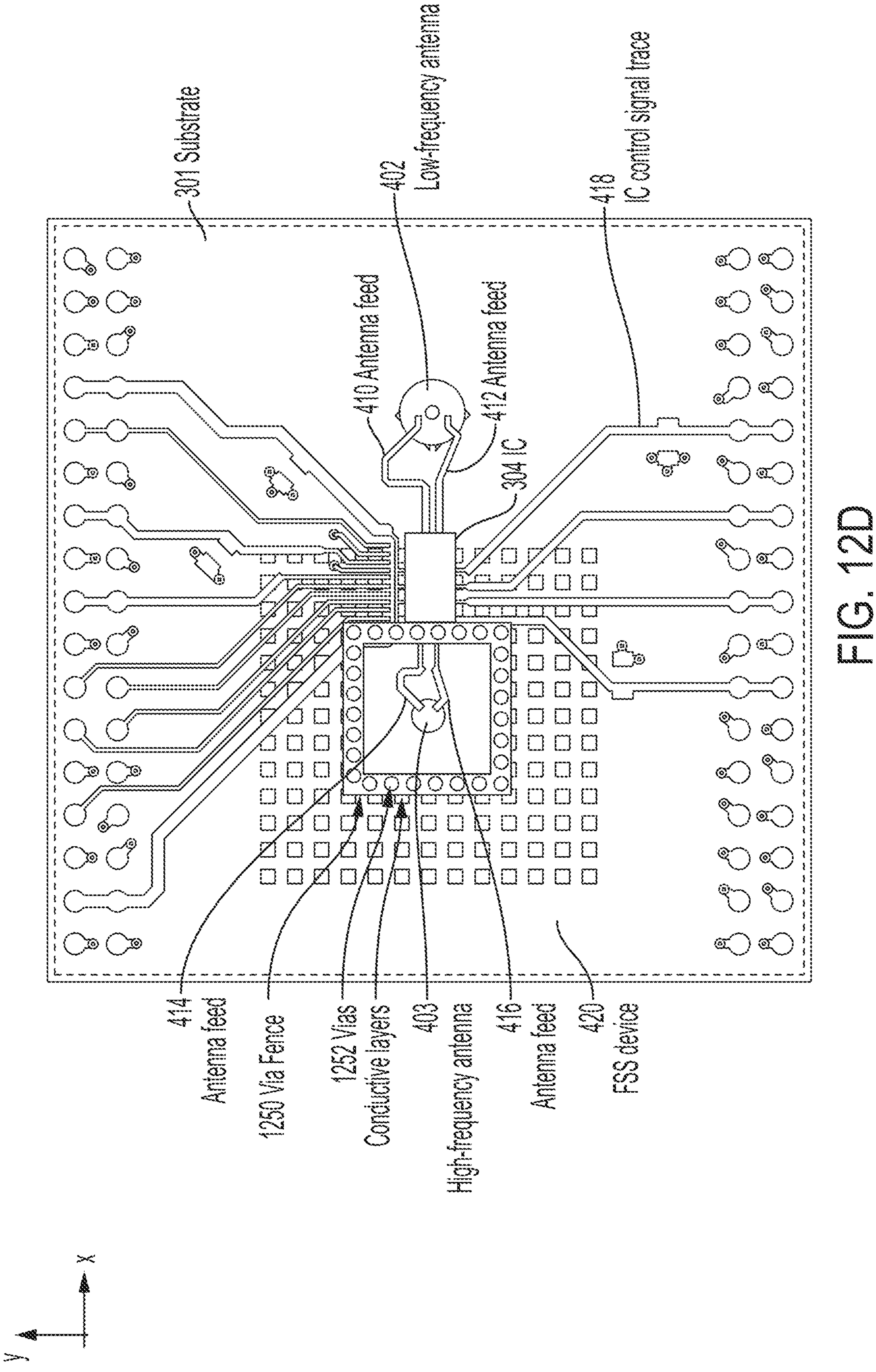
FIG. 12D is a front-side schematic diagram of a substrate including a via fence, in accordance with some embodiments of the technology described herein.

A possible via fence implementation is depicted in FIG. 12D, in accordance with some embodiments. Via fence 1250 includes a plurality of vias 1252 surrounding high-frequency antenna 403. The vias 1252 pass through one or more among conductive layers 604, 608, 612 and 612. For example, vias 1252 may extend from the topmost conductive layer (604) down to the ground plane.

It should be appreciated that via fences of the types described herein may be used in combination with, or instead of, FSS devices to suppress radiation. In the example of FIG. 12D, via fence 1250 is used in addition to FSS device 420.

Figure 12E:
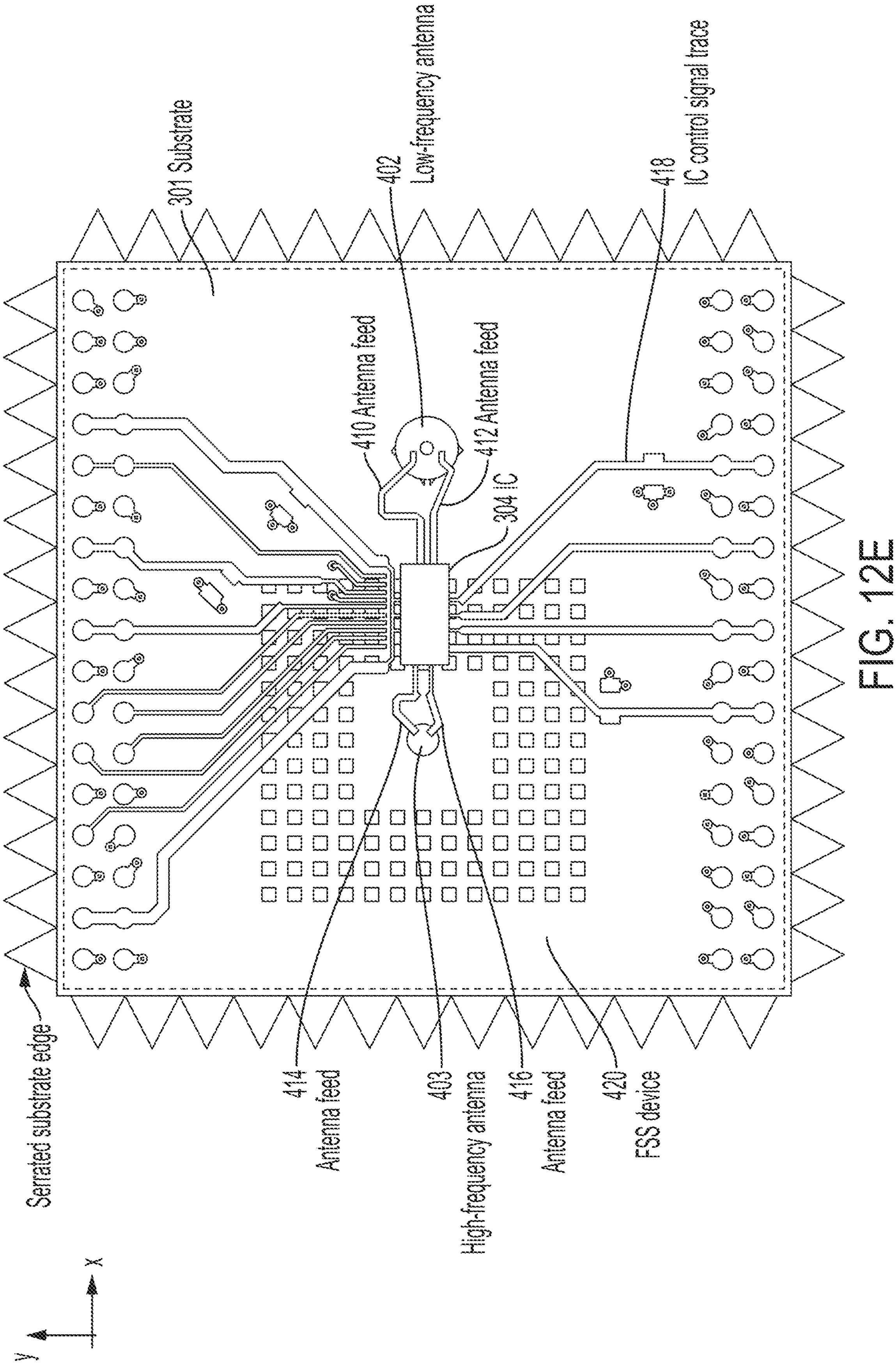
FIG. 12E is a front-side schematic diagram of a substrate having serrated edges, in accordance with some embodiments of the technology described herein.

In some embodiments, substrate 301 may have serrated edges, as depicted in FIG. 12E. The serrated edges enable suppression of surface waves, thereby reducing the extent to which surface waves generated by high-frequency antenna 403 couple to low-frequency antenna 402 (and vice versa). It some embodiments, all the edges of substate 301 are serrated. In other embodiments, only a subset of the edges is serrated. A substrate edge may be serrated in its entirety, or alternatively, only a portion of a substrate edge may be serrated.

Figure 12F:
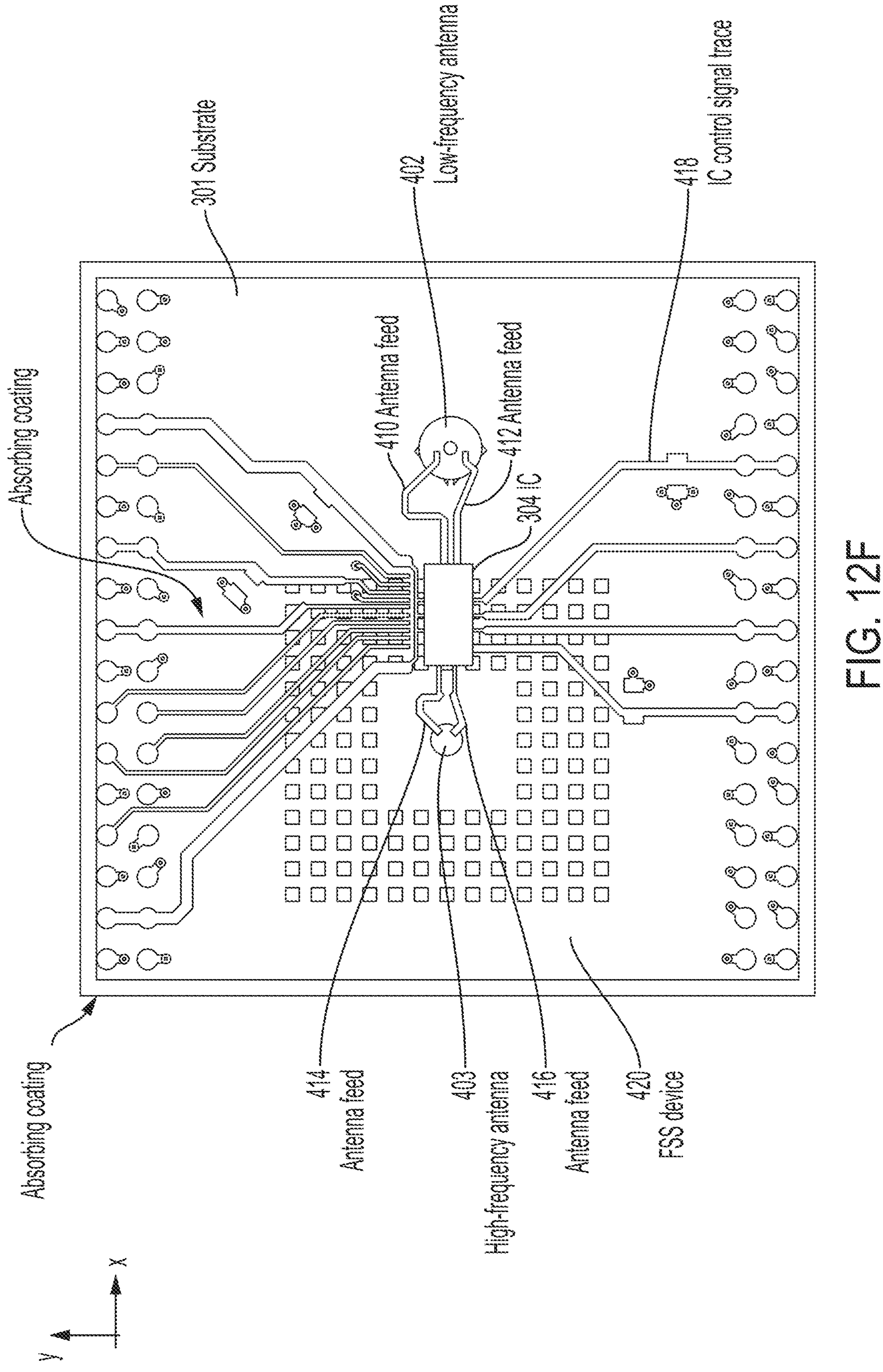
FIG. 12F is a front-side schematic diagram of a substrate including absorbers, in accordance with some embodiments of the technology described herein.

In some embodiments, one or more absorbers may be used to absorb surface waves. Examples of absorbers include absorbing coatings, absorbing foams and absorbing dielectrics, though other types of absorbers are also possible. In the example of FIG. 12F, absorber coatings are applied or painted to the edges of the substrate. Additionally, or alternatively, an absorbing coating can be applied down the middle or around the antennas or around any location where the unwanted currents need to be absorbed.

Some embodiments relate to substrates including means for suppressing surface waves emitted by high-frequency antenna 403. The means may surround high-frequency antenna 403. The means may include an FSS device 420 and/or a via fence 1250 and/or a ring-shaped structure 1200 and/or a spiral-shaped slot 1202 and/or a spiral shaped structure 1204 and/or an absorber coating.

Figure 13:
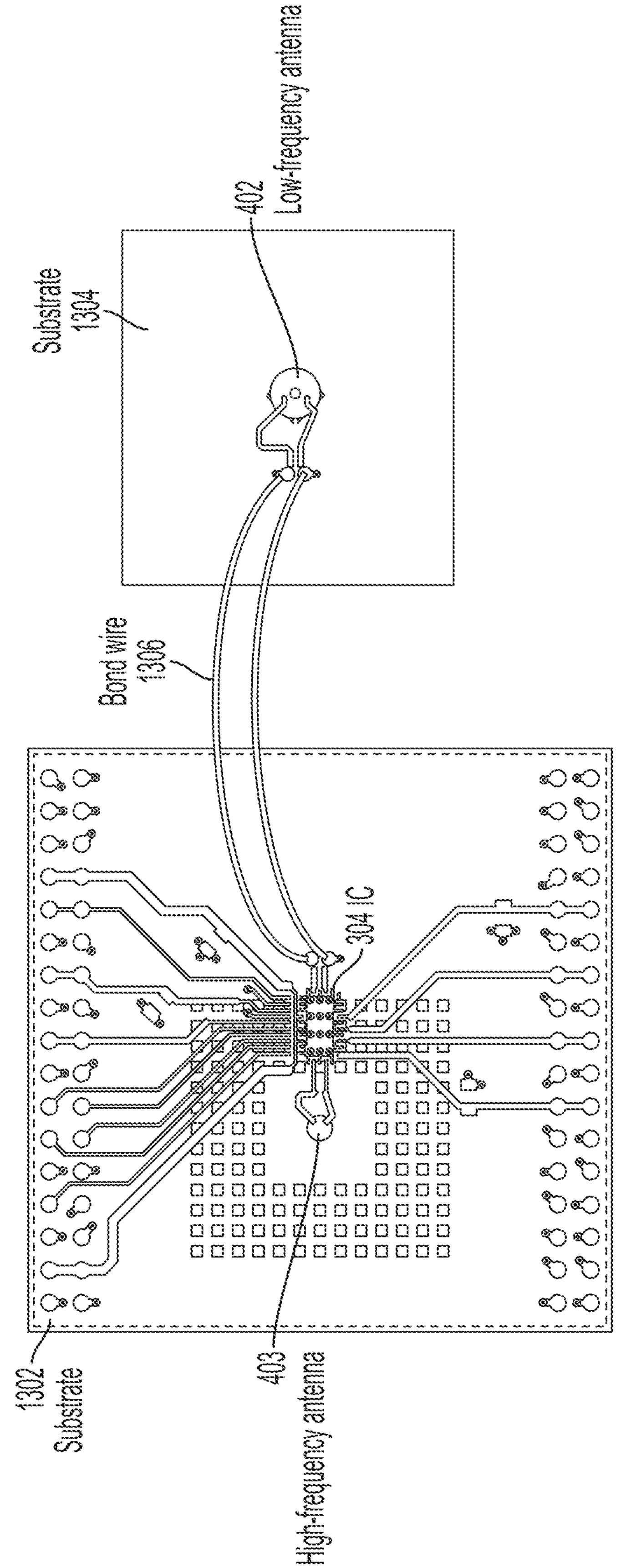
FIG. 13 is a block diagram of another illustrative device that may part of an interrogator device and/or a target device, in accordance with some embodiments of the technology described herein.

FIG. 13 illustrates an alternative implementation for an RF localization device, in accordance with some embodiments of the technology described herein. This RF localization device is similar to the RF localization device of FIG. 4. However, unlike the RF localization device of FIG. 4, high-frequency antenna 403 is formed on one substrate (1302) and low-frequency antenna 402 is formed on another substrate (1304). Although IC 304 is shown as being mounted on substrate 1302 next to high-frequency antenna 403, in other embodiments, IC 304 may be mounted on substrate 1304 next to low-frequency antenna 402 (or on a third substrate). Bond wires 1306 connect substrates 1302 and 1304 to one another.

Having thus described several aspects some embodiments, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

Various features and aspects of the present disclosure may be used alone, in any combination of two or more, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which examples have been provided with reference to FIGS. 13 and 16A. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The terms “approximately”, “substantially,” and “about” may be used to mean within ±20% of a target value in some embodiments, within ±10% of a target value in some embodiments, within ±5% of a target value in some embodiments, and within ±2% of a target value in some embodiments. The terms “approximately” and “about” may include the target value.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of “including,” “comprising,” “having,” “containing,” “involving,” and variations thereof herein, is meant to encompass the items listed thereafter and equivalents thereof as well as additional items.

What is claimed is:

1. A radio-frequency (RF) device comprising:
one or more substrates collectively comprising:
a first RF antenna configured for wireless communication in a first RF band;
a second RF antenna configured for wireless communication in a second RF band different from the first RF band;
a first slot and a second slot, wherein the first and second slots have different shapes relative to each other;
a first antenna feed coupled to the first slot, wherein the first antenna feed is configured to communicate with the first RF antenna through the first slot; and
a second antenna feed coupled to the second slot, wherein the second antenna feed is configured to communicate with the second RF antenna through the second slot.

2. The RF device of claim 1, wherein the one or more substrates comprises a first substrate and a second substrate, wherein the first substrate comprises the first RF antenna, the first slot and the first antenna feed, and wherein the second substrate comprises the second RF antenna, the second slot and the second antenna feed.

3. The RF device of claim 1, wherein the one or more substrates comprises a single substrate comprising the first and second RF antennas, the first and second slots and the first and second antenna feeds.

4. The RF device of claim 1, wherein the first slot is L-shaped and the second slot is not L-shaped.

5. The RF device of claim 1, wherein the second slot is ring-shaped and the first slot is not ring-shaped.

6. The RF device of claim 1, wherein the first slot has a segmented contour and the second slot has a continuous contour.

7. The RF device of claim 1, wherein the first slot is L-shaped and the second slot is ring-shaped.

8. The RF device of claim 1, wherein:
the first RF antenna is patterned on a first conductive layer of the one or more substrates;
the first RF antenna feed is patterned on a second conductive layer of the one or more substrates; and
the first slot is formed through a third conductive layer of the one or more substrates, the third conductive layer being positioned between the first and second conductive layers.

9. The RF device of claim 1, wherein:
the first RF antenna is configured to receive a first RF signal having a first center frequency from an interrogator device different from the RF device,
the second RF antenna is configured to transmit, to the interrogator device, a second RF signal having a second center frequency different from the first center frequency, and
the RF device further comprises circuitry configured to:
receive the first RF signal from the first RF antenna,
generate the second RF signal in response to receiving the first RF signal, and
provide to the second RF antenna the second RF signal to be transmitted by the second RF antenna.

10. A radio-frequency (RF) device comprising:
one or more substrates collectively comprising:
a first RF antenna configured for wireless communication in a first RF band;
a second RF antenna configured for wireless communication in a second RF band different from the first RF band;

a first slot and a second slot, wherein:
the first slot is L-shaped and the second slot is not L-shaped, or
the second slot is ring-shaped and the first slot is not ring-shaped, or
the first slot has a segmented contour and the second slot has a continuous contour, or
the first slot is L-shaped and the second slot is ring-shaped,
a first antenna feed coupled to the first slot, wherein the first antenna feed is configured to communicate with the first RF antenna through the first slot; and
a second antenna feed coupled to the second slot, wherein the second antenna feed is configured to communicate with the second RF antenna through the second slot.

11. The RF device of claim 10, wherein the one or more substrates comprises a first substrate and a second substrate, wherein the first substrate comprises the first RF antenna, the first slot and the first antenna feed, and wherein the second substrate comprises the second RF antenna, the second slot and the second antenna feed.

12. The RF device of claim 10, wherein the one or more substrates comprises a single substrate comprising the first and second RF antennas, the first and second slots and the first and second antenna feeds.

13. The RF device of claim 10, wherein:
the first RF antenna is patterned on a first conductive layer of the one or more substrates;
the first RF antenna feed is patterned on a second conductive layer of the one or more substrates; and
the first slot is formed through a third conductive layer of the one or more substrates, the third conductive layer being positioned between the first and second conductive layers.

14. The RF device of claim 10, wherein:
the first RF antenna is configured to receive a first RF signal having a first center frequency from an interrogator device different from the RF device,
the second RF antenna is configured to transmit, to the interrogator device, a second RF signal having a second center frequency different from the first center frequency, and
the RF device further comprises circuitry configured to:
receive the first RF signal from the first RF antenna,
generate the second RF signal in response to receiving the first RF signal, and
provide to the second RF antenna the second RF signal to be transmitted by the second RF antenna.

* * * * *